United States Patent
Yang et al.

(10) Patent No.: US 11,968,043 B2
(45) Date of Patent: Apr. 23, 2024

(54) CODED SPREADING AND INTERLEAVING FOR MULTI-LEVEL CODING SYSTEMS

(71) Applicant: QUALCOMM Incorporated, San Diego, CA (US)

(72) Inventors: Wei Yang, San Diego, CA (US); Jing Jiang, San Diego, CA (US); Thomas Joseph Richardson, South Orange, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/822,631

(22) Filed: Aug. 26, 2022

(65) Prior Publication Data

US 2024/0072934 A1 Feb. 29, 2024

(51) Int. Cl.
    *H04L 1/00* (2006.01)

(52) U.S. Cl.
    CPC .......... *H04L 1/0071* (2013.01); *H04L 1/0003* (2013.01); *H04L 1/0042* (2013.01)

(58) Field of Classification Search
    CPC .... H04L 1/0071; H04L 1/0003; H04L 1/0042
    See application file for complete search history.

(56) References Cited

U.S. PATENT DOCUMENTS

| 8,824,590 | B2* | 9/2014 | Kim ................. H04L 25/03197 375/295 |
| 9,780,910 | B2* | 10/2017 | Wadsworth .......... H04N 21/631 |
| 2018/0175981 | A1* | 6/2018 | Manolakos ........... H04L 5/0046 |
| 2020/0127758 | A1* | 4/2020 | Khoshnevisan .... H04L 27/3488 |

OTHER PUBLICATIONS

Y. Liu, X. Wang, A. B. Sediq, G. Boudreau and H. Li, "An adaptive two-dimensional non-orthogonal multiple access technique using multi-level modulation and interleaving," 2017 3rd IEEE International Conference on Computer and Communications (ICCC), Chengdu, China, 2017, pp. 57-62 (Year: 2017).*

* cited by examiner

*Primary Examiner* — Cynthia Britt
(74) *Attorney, Agent, or Firm* — QUALCOMM Incorporated

(57) ABSTRACT

Various aspects of the present disclosure generally relate to wireless communication. In some aspects, a wireless communication device may identify a first set of bits associated with a first set of modulation layers. The wireless communication device may interleave a second set of bits associated with a second set of modulation layers to obtain an interleaved second set of bits. The wireless communication device may generate a combined set of bits based at least in part on combining the second set of bits and at least a portion of the first set of bits. The wireless communication device may perform a transmission based at least in part on the combined set of bits and the second set of bits. Numerous other aspects are described.

30 Claims, 15 Drawing Sheets

CODED SPREADING AND INTERLEAVING FOR MULTI-LEVEL CODING SYSTEMS

FIELD OF THE DISCLOSURE

Aspects of the present disclosure generally relate to wireless communication and to techniques and apparatuses for coded spreading and interleaving for multi-level coding systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
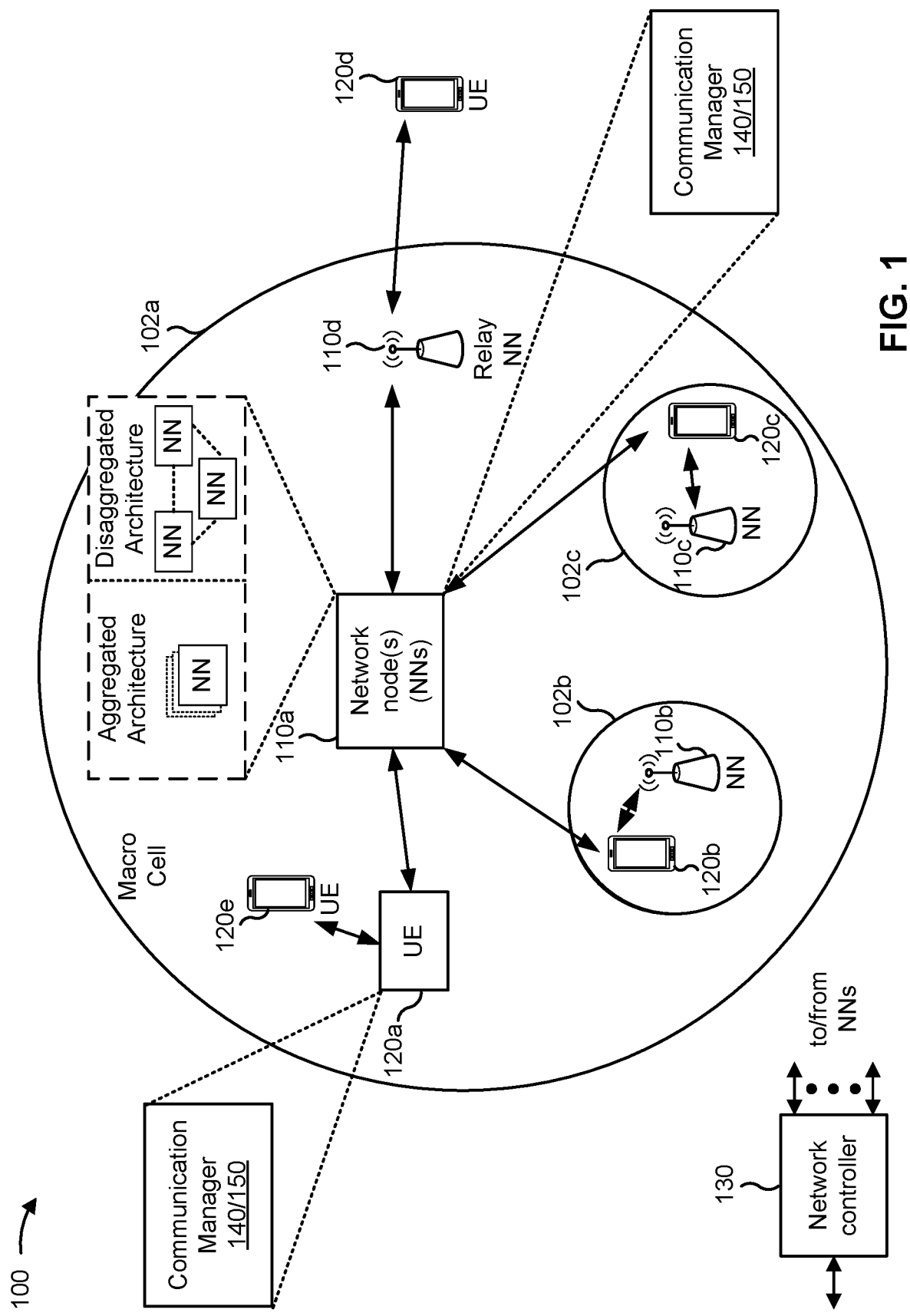
FIG. 1 is a diagram illustrating an example of a wireless network, in accordance with the present disclosure.

Some aspects described herein relate to a method of wireless communication performed by a wireless communication device. The method may include identifying a first set of bits associated with a first set of modulation layers. The method may include interleaving a second set of bits associated with a second set of modulation layers to obtain an interleaved second set of bits. The method may include generating a combined set of bits based at least in part on combining the second set of bits and at least a portion of the first set of bits. The method may include performing a transmission based at least in part on the combined set of bits and the second set of bits.

Some aspects described herein relate to a method of wireless communication performed by a wireless communication device. The method may include receiving an input that is based at least in part on a first set of bits associated with a first set of modulation layers and an interleaved second set of bits associated with a second set of modulation layers. The method may include de-interleaving the interleaved second set of bits to obtain a non-interleaved second set of bits. The method may include generating a first log-likelihood ratio (LLR) associated with decoding the first set of bits and a second LLR associated with decoding the non-interleaved second set of bits. The method may include decoding the first set of bits, based at least in part on the first LLR, to obtain a non-encoded first set of bits. The method may include decoding the non-interleaved second set of bits, based at least in part on the second LLR, to obtain a non-encoded second set of bits.

Some aspects described herein relate to an apparatus for wireless communication performed by a wireless communication device. The apparatus may include a memory and one or more processors, coupled to the memory. The one or more processors may be configured to identify a first set of bits associated with a first set of modulation layers. The one or more processors may be configured to interleave a second set of bits associated with a second set of modulation layers to obtain an interleaved second set of bits. The one or more processors may be configured to generate a combined set of bits based at least in part on combining the second set of bits and at least a portion of the first set of bits. The one or more processors may be configured to perform a transmission based at least in part on the combined set of bits and the second set of bits.

Some aspects described herein relate to an apparatus for wireless communication performed by a wireless communication device. The apparatus may include a memory and one or more processors, coupled to the memory. The one or more processors may be configured to receive an input that is based at least in part on a first set of bits associated with a first set of modulation layers and an interleaved second set of bits associated with a second set of modulation layers. The one or more processors may be configured to de-interleave the interleaved second set of bits to obtain a non-interleaved second set of bits. The one or more processors may be configured to generate a first LLR associated with decoding the first set of bits and a second LLR associated with decoding the non-interleaved second set of bits. The one or more processors may be configured to decode the first set of bits, based at least in part on the first LLR, to obtain a non-encoded first set of bits. The one or more processors may be configured to decode the non-interleaved second set of bits, based at least in part on the second LLR, to obtain a non-encoded second set of bits.

Some aspects described herein relate to a non-transitory computer-readable medium that stores a set of instructions for wireless communication by a wireless communication device. The set of instructions, when executed by one or more processors of the wireless communication device, may cause the wireless communication device to identify a first set of bits associated with a first set of modulation layers. The set of instructions, when executed by one or more processors of the wireless communication device, may cause the wireless communication device to interleave a second set of bits associated with a second set of modulation layers to obtain an interleaved second set of bits. The set of instructions, when executed by one or more processors of the wireless communication device, may cause the wireless communication device to generate a combined set of bits based at least in part on combining the second set of bits and at least a portion of the first set of bits. The set of instructions, when executed by one or more processors of the wireless communication device, may cause the wireless communication device to perform a transmission based at least in part on the combined set of bits and the second set of bits.

Some aspects described herein relate to a non-transitory computer-readable medium that stores a set of instructions for wireless communication by a wireless communication device. The set of instructions, when executed by one or more processors of the wireless communication device, may cause the wireless communication device to receive an input that is based at least in part on a first set of bits associated with a first set of modulation layers and an interleaved second set of bits associated with a second set of modulation layers. The set of instructions, when executed by one or more processors of the wireless communication device, may cause the wireless communication device to de-interleave the interleaved second set of bits to obtain a non-interleaved second set of bits. The set of instructions, when executed by one or more processors of the wireless communication device, may cause the wireless communication device to generate a first LLR associated with decoding the first set of bits and a second LLR associated with decoding the non-interleaved second set of bits. The set of instructions, when executed by one or more processors of the wireless communication device, may cause the wireless communication device to decode the first set of bits, based at least in part on the first LLR, to obtain a non-encoded first set of bits. The set of instructions, when executed by one or more processors of the wireless communication device, may cause the wireless communication device to decode the non-interleaved second set of bits, based at least in part on the second LLR, to obtain a non-encoded second set of bits.

Some aspects described herein relate to an apparatus for wireless communication. The apparatus may include means for identifying a first set of bits associated with a first set of modulation layers. The apparatus may include means for interleaving a second set of bits associated with a second set of modulation layers to obtain an interleaved second set of bits. The apparatus may include means for generating a combined set of bits based at least in part on combining the second set of bits and at least a portion of the first set of bits. The apparatus may include means for performing a transmission based at least in part on the combined set of bits and the second set of bits.

Some aspects described herein relate to an apparatus for wireless communication. The apparatus may include means for receiving an input that is based at least in part on a first set of bits associated with a first set of modulation layers and an interleaved second set of bits associated with a second set of modulation layers. The apparatus may include means for de-interleaving the interleaved second set of bits to obtain a non-interleaved second set of bits. The apparatus may include means for generating a first LLR associated with decoding the first set of bits and a second LLR associated with decoding the non-interleaved second set of bits. The apparatus may include means for decoding the first set of bits, based at least in part on the first LLR, to obtain a non-encoded first set of bits. The apparatus may include means for decoding the non-interleaved second set of bits, based at least in part on the second LLR, to obtain a non-encoded second set of bits.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, a RAT subsequent to 5G (e.g., 6G), and/or Wi-Wi (e.g., Wi-Fi 8), among other examples.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or more (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless communication device may include a communication manager 140. As described in more detail elsewhere herein, the communication manager 140 may identify a first set of bits associated with a first set of modulation layers; interleave a second set of bits associated with a second set of modulation layers to obtain an interleaved second set of bits; generate a combined set of bits based at least in part on combining the second set of bits and at least a portion of the first set of bits; and perform a transmission based at least in part on the combined set of bits and the second set of bits. Additionally, or alternatively, the communication manager 140 may perform one or more other operations described herein.

In some aspects, the wireless communication device may include a communication manager 150. As described in more detail elsewhere herein, the communication manager 150 may receive an input that is based at least in part on a first set of bits associated with a first set of modulation layers and an interleaved second set of bits associated with a second set of modulation layers; de-interleaving the interleaved second set of bits to obtain a non-interleaved second set of bits; generate a first log-likelihood ratio (LLR) associated with decoding the first set of bits and a second LLR associated with decoding the non-interleaved second set of bits; decode the first set of bits, based at least in part on the first LLR, to obtain a non-encoded first set of bits; and decode the non-interleaved second set of bits, based at least in part on the second LLR, to obtain a non-encoded second set of bits. Additionally, or alternatively, the communication manager 150 may perform one or more other operations described herein.

As indicated above, FIG. 1 is provided as an example. Other examples may differ from what is described with regard to FIG. 1.

Figure 2:
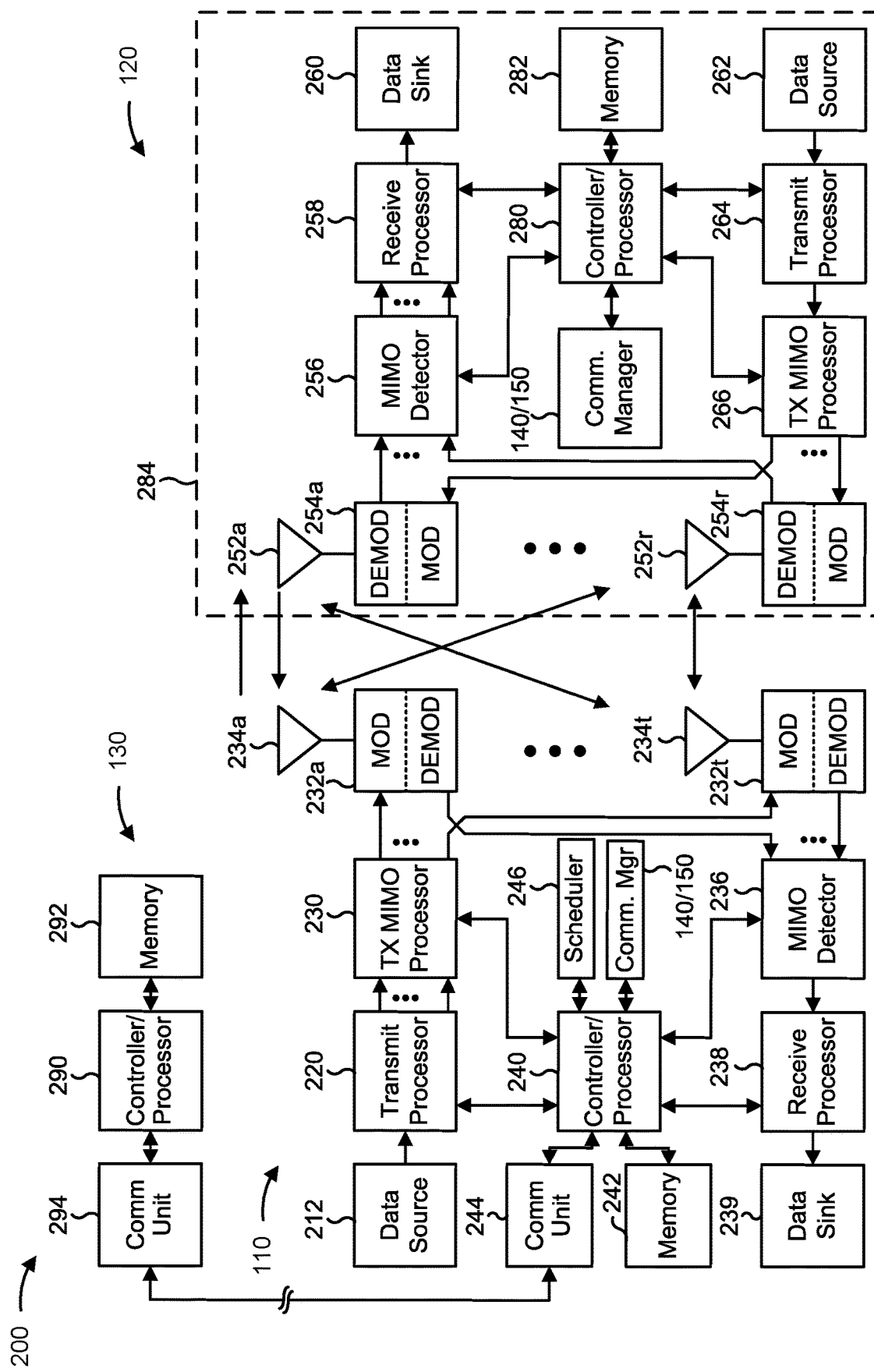
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-15).

The controller/processor 240 of the network node 110, the controller/processor 280 of the UE 120, and/or any other component(s) of FIG. 2 may perform one or more techniques associated with coded spreading and interleaving for multi-level coding systems, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the wireless communication device (e.g., the UE 120 or the network node 110) includes means for identifying a first set of bits associated with a first set of modulation layers; means for interleaving a second set of bits associated with a second set of modulation layers to obtain an interleaved second set of bits; means for generating a combined set of bits based at least in part on combining the second set of bits and at least a portion of the first set of bits; and/or means for performing a transmission based at least in part on the combined set of bits and the second set of bits. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless communication device (e.g., the UE 120 or the network node 110) includes means for receiving an input that is based at least in part on a first set of bits associated with a first set of modulation layers and an interleaved second set of bits associated with a second set of modulation layers; means for de-interleaving the interleaved second set of bits to obtain a non-interleaved second set of bits; means for generating a first LLR associated with decoding the first set of bits and a second LLR associated with decoding the non-interleaved second set of bits; means for decoding the first set of bits, based at least in part on the first LLR, to obtain a non-encoded first set of bits; and/or means for decoding the non-interleaved second set of bits, based at least in part on the second LLR, to obtain a non-encoded second set of bits. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or more other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
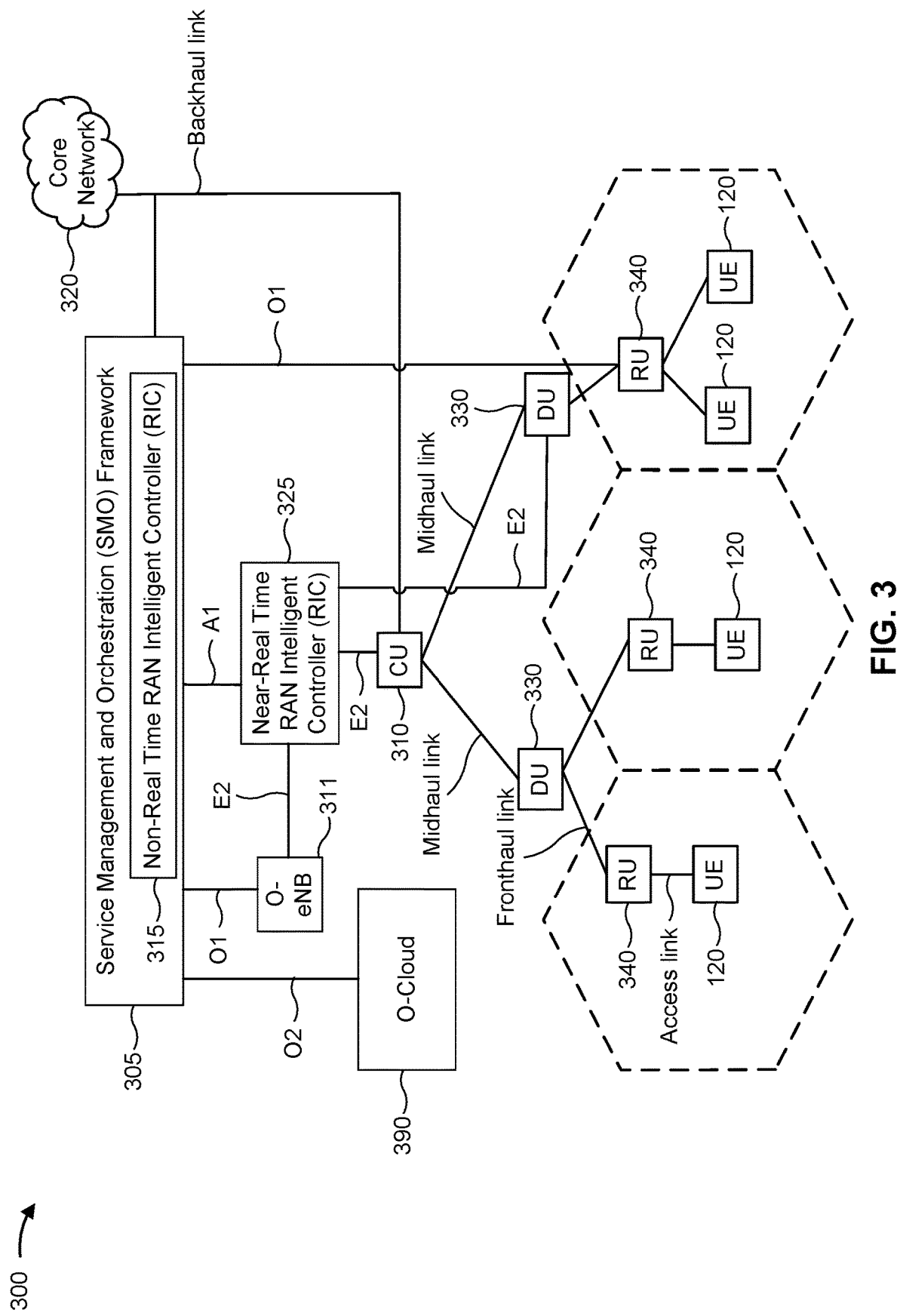
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or more communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
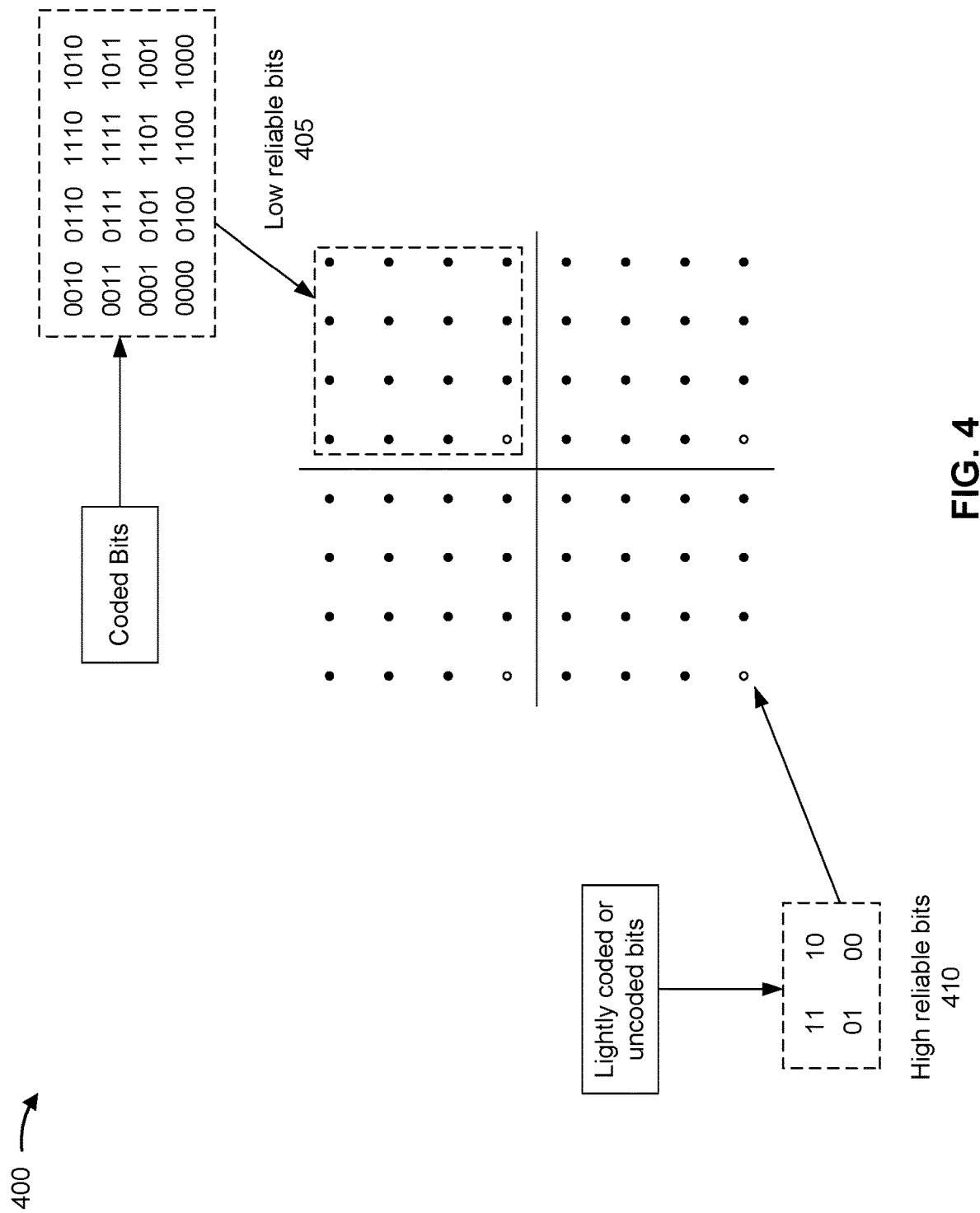
FIG. 4 is a diagram illustrating an example of a constellation for bit mapping, in accordance with the present disclosure.

FIG. 4 is a diagram illustrating an example 400 of a constellation with bit mapping, in accordance with the present disclosure. In some cases, such as for higher order modulation, a bit tuple (e.g., binary tuple) may be mapped to a constellation or modulation symbol to achieve an improved (e.g., larger) spectral efficiency. The bit tuple may be an ordered tuple with a domain in the set {0,1}. The bit tuple that is mapped to the constellation or modulation symbol may result in a spectral efficiency that is greater than binary phase shift keying (BPSK). In some cases, depending on how each bit in the bit tuple is mapped to a respective constellation point, the reliability of the bits may be different by a certain amount. In the 64 quadrature amplitude modulation (QAM) example shown in FIG. 4 (six bits maps to one constellation point), conditioned on the last four bits, the first two bits may form a quadrature phase shift keying (QPSK) constellation and can be decoded with high reliability (e.g., provided that the receiver is configured with information associated with the last 4 bits).

In some cases, multi-level coding (MLC) may be used to separate channel codes on bits that are mapped to different levels of the constellation points. In the 64 QAM example, as shown by reference number 405, the last four bits (least significant bits (LSBs)) may be jointly encoded with one codeword. As shown by reference number 410, the first two bits (most significant bits ((MSBs)) may be encoded using a different codeword than the first set of bits. For example, the first two bits may be encoded using a simple code (e.g., a light code) or may be uncoded. One advantage of MLC is that a simple code or no code may applied on the MSBs. This may result in improved energy savings and reduced coding complexity.

In some cases, MLC may be difficult to apply to wireless communications due to channel selectivity. For example, whereas wired communications may have relatively stable channel conditions, wireless channel conditions may change with greater frequency. In one example, a level one coding (for the LSBs) may use low-density parity-check (LDPC) coding, whereas a level two coding (for the MSBs) may use no coding or may use light coding. On an added white Gaussian noise (AWGN) channel (used for wired communications), the channel conditions on the MSBs may be ten (or more) decibels (dB) better than the channel conditions on the LSBs, and all symbols may have an equal signal-to-noise ratio (SNR). However, on a wireless channel, there may be fading and interference, which may attenuate the signal strength and may reduce the signal-to-interference-plus-noise ratio (SINR) and/or thermal noise. Furthermore, the fading and interference on the respective symbols may be different by a certain amount. As a result, some modulation symbols may see worse SINR than other modulation symbols, and a packet error may be determined by the worst-case SINR across all of the modulation symbols. This may be resolved using channel coding on the LSBs, but may not be resolved using channel coding for the MSBs since the MSBs may be lightly coded or uncoded. In this case, more complex channel coding may need to be used, resulting in reduced energy efficiency and increased coding complexity.

Techniques and apparatuses are described herein for coded spreading and interleaving for MLC systems. In some aspects, a wireless communication device, such as a transmitter wireless communication device, may identify a first set of bits associated with a first set of modulation layers, and may interleave a second set of bits associated with a second set of modulation layers to obtain an interleaved second set of bits. The wireless communication device may generate a combined set of bits based at least in part on combining the interleaved second set of bits and at least a portion of the first set of bits, and may perform a transmission based at least in part on the combined set of bits and the interleaved second set of bits. In some aspects, a wireless communication device, such as a receiver wireless communication device, may receive an input that is based at least in part on a first set of bits associated with a first set of modulation layers and an interleaved second set of bits associated with a second set of modulation layers. The wireless communication device may de-interleave the interleaved second set of bits to obtain a non-interleaved second set of bits, and may generate a first LLR associated with decoding the first set of bits and a second LLR associated with decoding the non-interleaved second set of bits. The wireless communication device may decode the first set of bits, based at least in part on the first LLR, to obtain a non-encoded first set of bits, and may decode the non-interleaved second set of bits, based at least in part on the second LLR, to obtain a non-encoded second set of bits.

As described above, MLC may be effective for wired communications due to the relatively stable channel conditions for the wired communications. In contrast, MLC may not be effective for wireless communications since the channel conditions may change with greater frequency. For example, on a wireless channel, there may be fading and interference, which may attenuate the signal strength and may reduce the SINR. Therefore, some modulation symbols may see worse SINR than other modulation symbols, and the packet error may be determined by the worst-case SINR across all of the modulation symbols. Using the techniques and apparatuses described herein, a wireless communication device may apply coded spreading and interleaving for different MLC modulation levels. This may enable the wireless communication device to communicate a wireless signal using MLC, thereby resulting in improved energy savings and reduced coding complexity. Additional details regarding these features are described herein.

As indicated above, FIG. 4 is provided as an example. Other examples may differ from what is described with regard to FIG. 4.

Figure 5:
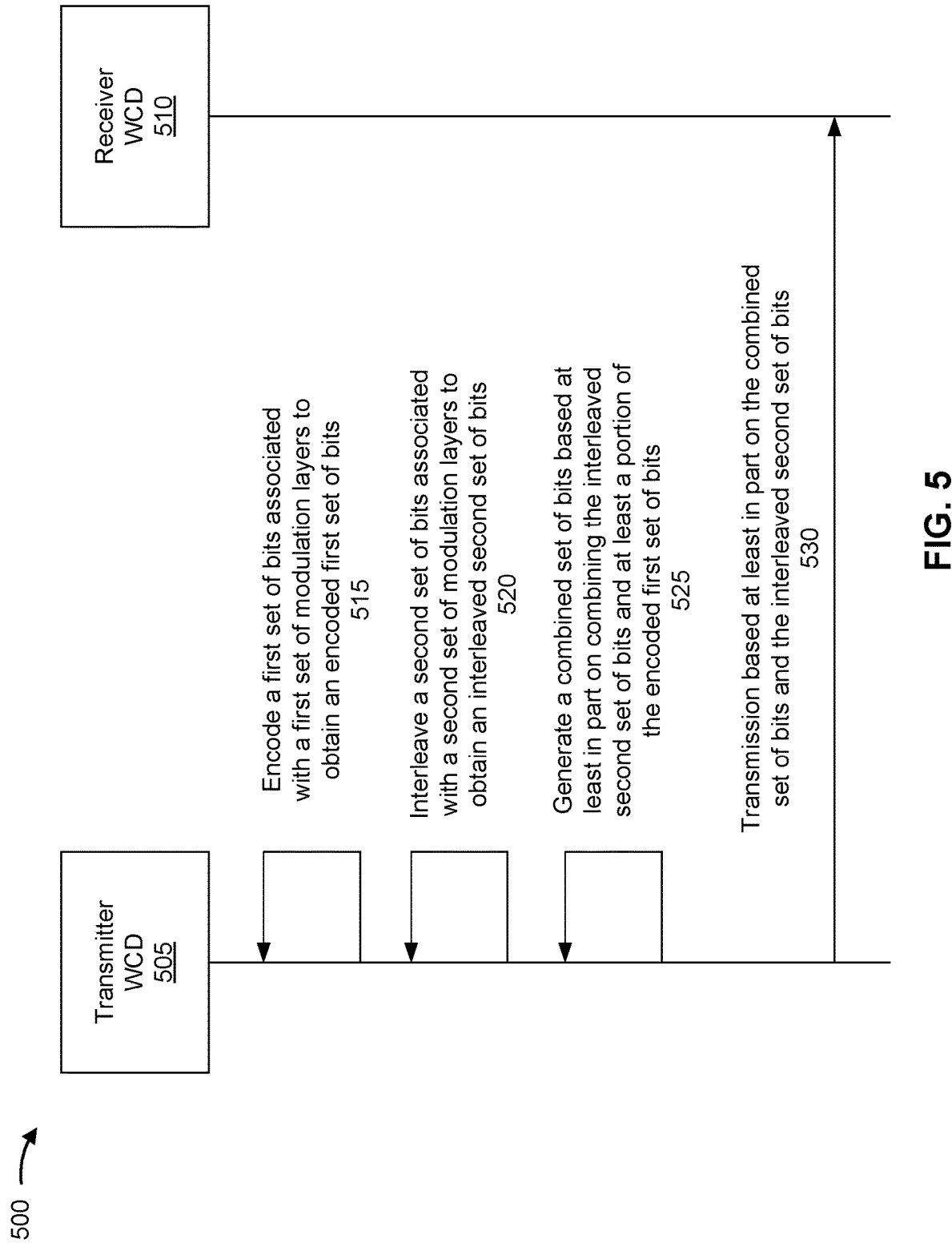
FIG. 5 is a diagram illustrating an example of coded spreading and interleaving for multi-level coding (MLC), in accordance with the present disclosure.

FIG. 5 is a diagram illustrating an example 500 of coded spreading and interleaving for MLC, in accordance with the present disclosure. As shown, a transmitter wireless communication device (WCD) 505 may communicate with a receiver wireless communication device 510. The transmitter wireless communication device 505 may be a UE, such as the UE 120, or may be a network node, such as the network node 110. Similarly, the receiver wireless communication device 510 may be a UE, such as the UE 120, or may be a network node, such as the network node 110. In one example, the transmitter wireless communication device 505 may be the UE 120 and the receiver wireless communication device 510 may be the network node 110. In another example, the transmitter wireless communication device 505 may be the network node 110 and the receiver wireless communication device 510 may be the UE 120. In some aspects, an MLC system may be associated with a first set of modulation layers and a second set of modulation layers. The first set of modulation layers may include one or more modulation layers. Additionally, or alternatively, the second set of modulation layers may include one or more modulation layers.

As shown by reference number 515, the transmitter wireless communication device 505 may identify a first set of bits associated with the first set of modulation layers. In some aspects, the transmitter wireless communication device 505 may encode the first set of bits associated with the first set of modulation layers to obtain an encoded first set of bits. While the first set of bits may be referred to herein as an encoded first set of bits, in some aspects, the first set of bits may be a non-encoded first set of bits. In some aspects, the transmitter wireless communication device 505 may apply a forward error correcting code (FEC) to the first set of modulation layers or a subset of the first set of modulation layers. The transmitter wireless communication device 505 may encode the first set of bits associated with the first set of modulation layers using a first type of encoding and/or using a first type of encoder. For example, the transmitter wireless communication device 505 may encode the first set of bits with a first type of encoding (and/or a first type of encoder) such as a complex coding or a high coding rate coding.

In some aspects, the second set of bits may be mapped to the first set of modulation layers and a second set of modulation layers. In this case, a transmission that includes the second set of bits (or a portion of the second set of bits) may be occur on the first set of modulation layers and the second set of modulation layers. Additional details describing these features are provided below.

As shown by reference number 520, the transmitter wireless communication device 505 may interleave a second set of bits associated with a second set of modulation layers to obtain an interleaved second set of bits. The transmitter wireless communication device 505 may interleave the second set of bits based at least in part on mapping the second set of bits to the first set of modulation layers and the second set of modulation layers. In some aspects, the second set of bits associated with the second set of modulation layers may be interleaved such that a same bit corresponding to the first set of modulation layers and the second set of modulation layers does not modulate to the same modulation symbol in the first set of modulation layers and the second set of modulation layers. In some aspects, the transmitter wireless communication device 505 may optionally interleave the first set of bits associated with the first set of modulation layers. For example, the transmitter wireless communication device 505 may interleave the output from the first type of encoder.

In some aspects, the transmitter wireless communication device 505 may interleave the second set of bits, but may not interleave the first set of bits. In some aspects, the transmitter wireless communication device 505 may interleave the first set of bits, but may not interleave the second set of bits. In some aspects, the transmitter wireless communication device 505 may interleave both the first set of bits and the second set of bits. In some aspects, the transmitter wireless communication device 505 may not interleave the first set of bits or the second set of bits. For example, the transmitter wireless communication device may combine the first set of bits and the second set of bits (as described below) without interleaving the first set of bits or the second set of bits. In some aspects, the second set of bits (and/or the first set of bits) may be interleaved prior to combining the first set of bits and the second set of bits. In some aspects, the second set of bits (and/or the first set of bits) may be interleaved after combining the first set of bits and the second set of bits.

In some aspects, the second set of bits may be interleaved prior to being combined with the first set of bits. In this case, when mapping the bits to the modulation, the combined set of bits and the second set of bits (e.g., the non-interleaved second set of bits) may be mapped to the same modulation. Additional details regarding this feature are shown in connection with FIG. 9. In some aspects, the first set of bits and the second set of bits may be combined without interleaving the first set of bits and the second set of bits. In this case, the second set of bits (and/or the first set of bits) may be interleaved before mapping the combined bits and the second set of bits to the modulation. Additional details regarding this feature are shown in connection with FIG. 11.

In some aspects, the transmitter wireless communication device 505 may encode the second set of bits prior to interleaving the second set of bits. For example, the transmitter wireless communication device 505 may apply an FEC to the second set of bits, or to a portion of the second set of bits, prior to interleaving the second set of bits. In some aspects, the transmitter wireless communication device 505 may encode the second set of bits after interleaving the second set of bits. In some aspects, the transmitter wireless communication device 505 may encode the second set of bits using a second type of encoding and/or using a second type of encoder. For example, the transmitter wireless communication device 505 may encode the second set of bits with a second type of coding (and/or a second type of encoder) such as a simple coding or a lower coding rate coding than the first type of coding. In one example, the second type of encoding may include a Reed-Solomon code, an LDPC, a Polar coding, or a Turbo coding, among other examples. In some aspects, the second set of bits may be uncoded. For example, the transmitter wireless communication device 505 may not encode the second set of bits prior to interleaving the second set of bits or after interleaving the second set of bits.

As shown by reference number 525, the transmitter wireless communication device 505 may generate a combined set of bits based at least in part on combining the interleaved second set of bits and the encoded first set of bits. In some aspects, the transmitter wireless communication device 505 may combine the interleaved second set of bits (or a portion of the interleaved second set of bits) and the encoded first set of bits (or a portion of the encoded first set of bits) using coded spreading. For example, the transmitter wireless communication device 505 may combine the second set of bits (e.g., the interleaved second set of bits) with the first set of bits (e.g., the encoded first set of bits) using an exclusive OR (XOR) operation. In one example, the second set of bits (or a portion of the second set of bits) may be XORed with a subset of the first set of modulation layers, and the second set of bits (or another portion of the second set of bits) may be XORed with another subset of the first set of modulation layers. The XOR operation for each modulation layer may be between the interleaved bits from the second set of modulation layers and the coded bits from the first set of modulation layers, and the XORed bits may be transmitted over the first set of modulation layers.

In some aspects, the combined set of bits may be based at least in part on (e.g., may include) the first set of bits associated with the first set of modulation layers and the second set of bits (e.g., the non-interleaved second set of bits) associated with the second set of modulation layers. For example, generating the combined set of bits may include performing an XOR operation between the first set of bits associated with the first set of modulation layers and the second set of bits (e.g., the non-interleaved second set of bits) associated with the second set of modulation layers. In this case, the interleaving does not change the ordering of the bits. For example, a first bit associated with the first set of bits may be mapped to a first bit associated with the second set of bits, and a second bit associated with the first set of bits may be mapped to a second bit associated with the second set of bits, among other examples.

In some aspects, only one of the modulation operation (as described in connection with reference number 520) and the combining operation (as described in connection with reference number 525) may need to be applied to an interleaved set of bits. For example, only one of the combining operation or the interleaving operation may be applied to the interleaved second set of bits. As described above, the interleaved second set of bits may be a non-interleaved set of bits when combined with the first set of bits.

As shown by reference number 530, the transmitter wireless communication device 505 may perform a transmission based at least in part on the combined set of bits and the second set of bits. In one example, the transmission may include an output associated with a first subset of the first set of modulation layers, an output associated with a second subset of the first set of modulation layers, and the interleaved second set of bits, where the output associated with the first subset of the first set of modulation layers includes a portion of the first set of bits associated with the first subset of the first set of modulation layers XORed with the interleaved second set of bits, and the output associated with the second subset of the first set of modulation layers includes another portion of the first set of bits associated with the second subset of the first set of modulation layers XORed with the interleaved second set of bits. Additional details regarding these features are described in connection with FIG. 6. In some aspects, the transmission may include the combined set of bits and the interleaved second set of bits. In some other aspects, the transmission may include the combined set of bits and the second set of bits (e.g., the non-interleaved second set of bits).

In some aspects, the MLC may be associated with any number of coding levels. For example, the MLC described above includes two coding levels, and the coded spreading and interleaving may be applied to any one or more of the two coding levels. In another example, the MLC may be associated with three coding levels, and the coded spreading and interleaving may be applied to any one or more of the three coding levels. For example, a first type of encoding and/or interleaving may be applied to a first set of modulation levels, a second type of encoding and/or interleaving may be applied to a second set of modulation levels, and a third type of encoding and/or interleaving may be applied to a third set of modulation levels. In some aspects, the coded spreading and interleaving described herein may be applied to QPSK or to other modulation orders, including but not limited to arbitrary modulation orders. In some aspects, the coded spreading and interleaving described herein may be applied in connection with probabilistic shaping and/or geometric shaping.

As described above, MLC may be effective for wired communications due to the relatively stable channel conditions for the wired communications. In contrast, MLC may not be effective for wireless communications since the channel conditions may change with greater frequency. For example, on a wireless channel, there may be fading and interference, which may attenuate the signal strength and may reduce the SINR. Therefore, some modulation symbols may see worse SINR than other modulation symbols, and the packet error may be determined by the worst-case SINR across all of the modulation symbols. Using the techniques and apparatuses described herein, a wireless communication device may apply coded spreading and interleaving for different MLC modulation levels. This may enable the wireless communication device to communicate a wireless signal using MLC, thereby resulting in improved energy savings and reduced coding complexity.

As indicated above, FIG. 5 is provided as an example. Other examples may differ from what is described with regard to FIG. 5.

Figure 6:
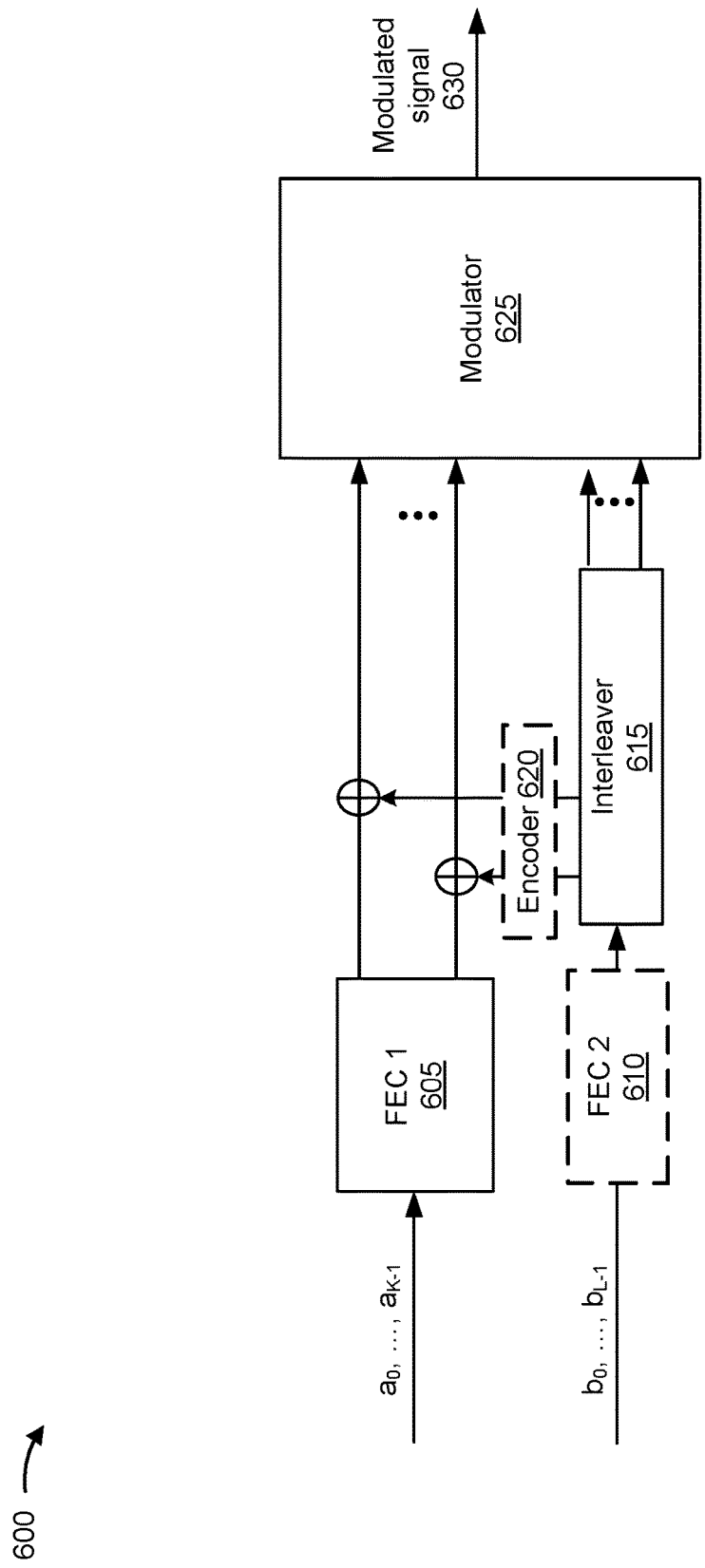
FIG. 6 is a diagram illustrating an example of a transmitter wireless communication device for MLC communication, in accordance with the present disclosure.

FIG. 6 is a diagram illustrating an example 600 of a transmitter wireless communication device for MLC communication, in accordance with the present disclosure. The transmitter wireless communication device may be the transmitter wireless communication device 505 described herein. In some aspects, the transmitter wireless communication device may include a first FEC encoder (FEC 1) 605, a second FEC encoder (FEC 2) 610, an interleaver 615, an encoder 620, and a modulator 625. In some aspects, the transmitter wireless communication device may optionally include the second FEC encoder 610 and the encoder 620 (e.g., the transmitter wireless communication device may not include one or more of the second FEC encoder 610 or the encoder 620).

In some aspects, the first FEC encoder 605 may encode a first set of bits $a_0$ through $a_{K-1}$ ($a_0, \ldots, a_{K-1}$) associated with a first set of modulation layers. The first FEC encoder 605 may output a set of bits associated with a first subset of the first set of modulation layers and another set of bits associated with a second subset of the first set of modulation layers.

In some aspects, the second FEC encoder 610 may encode a second set of bits $b_0$ through $b_{N-1}$ ($b_0, \ldots, b_{N-1}$) associated with a second set of modulation layers. As described herein, the second FEC encoder 610 may be optional. Thus, the second set of bits may not be encoded prior to an input of the interleaver 615. In some aspects, as described herein, the second FEC encoder 610 may use a light coding type whereas the first FEC encoder 605 may use a complex coding type.

In some aspects, the interleaver 615 may interleave the second set of bits (e.g., the encoded second set of bits or the non-encoded second set of bits). For example, the interleaver 615 may interleave the second set of bits such that a same bit corresponding to the first set of modulation layers and the second set of modulation layers does not modulate to the same modulation symbol in the first set of modulation layers and the second set of modulation layers. An output of the interleaver 615 may include an interleaved second set of bits. In some aspects, the interleaved second set of bits may be combined with the first set of bits (or a portion of the first set of bits) using an XOR operation. For example, the interleaved second set of bits may be XORed with the set of bits associated with the first subset of the first set of modulation layers, and the interleaved second set of bits may be XORed with the other set of bits associated with the second subset of the first set of modulation layers.

In some aspects, the encoder 620 may encode the interleaved second set of bits at the output of the interleaver 615. As described herein, the encoder 615 may be optional. The encoder 620 may encode the interleaved second set of bits in addition to, or alternatively to, the second FEC 610. For example, the second set of bits may be encoded (or may not be encoded) by the second FEC encoder 610, and the interleaved second set of bits may be encoded (or may not be encoded) by the encoder 620.

In some aspects, the modulator 625 may modulate the first set of bits and the second set of bits. As shown in the example 600, the modulator 625 may modulate the interleaved second set of bits, an output of the XOR operation between the interleaved second set of bits and the set of bits associated with the first subset of the first set of modulation layers, and an output of the XOR operation between the second set of bits and the other set of bits associated with the second subset of the first set of modulation layers. Other modulation combinations are contemplated, including but not limited to the combinations described in the examples herein. An output of the modulator 625 may include a modulated signal 630.

As indicated above, FIG. 6 is provided as an example. Other examples may differ from what is described with regard to FIG. 6.

Figure 7:
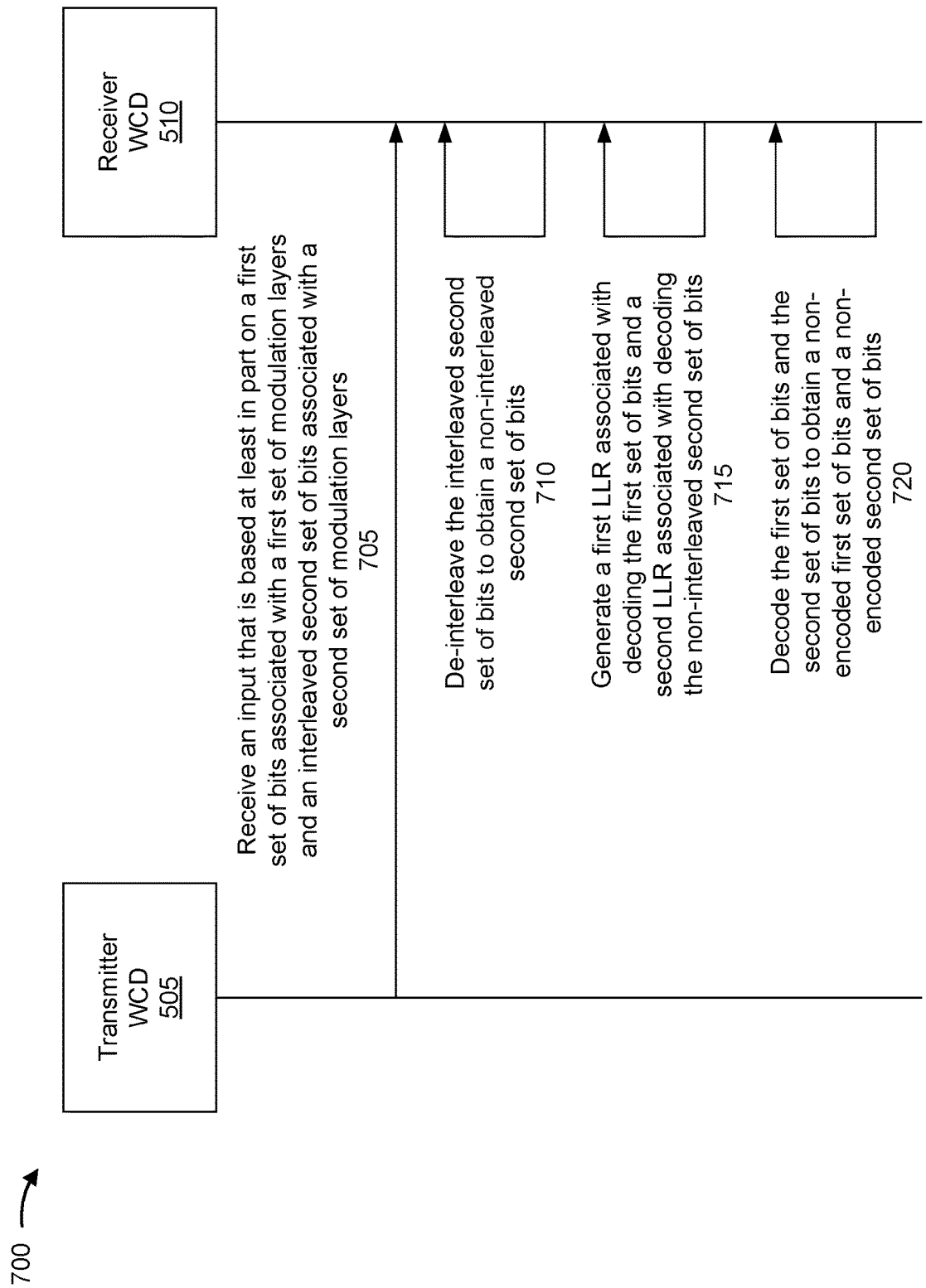
FIG. 7 is a diagram illustrating an example of coded spreading and interleaving for MLC, in accordance with the present disclosure.

FIG. 7 is a diagram illustrating an example 700 of coded spreading and interleaving for MLC, in accordance with the present disclosure. The transmitter wireless communication device 505 may communicate with the receiver wireless communication device 510. As described above, the transmitter wireless communication device 505 may be a UE, such as the UE 120, or may be a network node, such as the network node 110. Similarly, the receiver wireless communication device 510 may be a UE, such as the UE 120, or may be a network node, such as the network node 110.

As shown by reference number 705, the receiver wireless communication device 510 may receive an input that is based at least in part on a first set of bits associated with a first set of modulation layers and an interleaved second set of bits associated with a second set of modulation layers. In some aspects, the input may be received based at least in part on an output from an MLC configured transmitter, such as the transmitter wireless communication device 505. The first set of modulation layers may include one or more modulation layers. Additionally, or alternatively, the second set of modulation layers may include one or more modulation layers.

As shown by reference number 710, the receiver wireless communication device 510 may de-interleave the interleaved second set of bits to obtain a non-interleaved second set of bits. The interleaved second set of bits may be interleaved by the transmitter wireless communication device 505 as described above in connection with reference number 520 of FIG. 5. For example, the second set of bits may be interleaved by the transmitter wireless communication device 505 such that a same bit corresponding to the first set of modulation layers and the second set of modulation layers does not modulate to the same modulation symbol on the first set of modulation layers and the second set of modulation layers. The receiver wireless communication device 510 may de-interleave the interleaved second set of bits, such as by reversing the interleaving operation performed by the transmitter wireless communication device 505, to obtain the non-interleaved second set of bits.

As shown by reference number 715, the receiver wireless communication device 510 may generate a first LLR associated with decoding the first set of bits and a second LLR associated with decoding the non-interleaved second set of bits. In some aspects, the receiver wireless communication device 510 may generate the first LLR based at least in part on interference caused by the second set of bits (e.g., the non-interleaved second set of bits) to the encoded first set of bits. Additionally, or alternatively, the receiver wireless communication device 510 may generate the second LLR based at least in part on a combination of the observations for the second set of bits (e.g., the non-interleaved second set of bits) from both the first set of modulation layers and the second set of modulation layers.

As shown by reference number 720, the receiver wireless communication device 510 may decode the first set of bits and the second set of bits. For example, the receiver wireless communication device 510 may decode the first set of bits based at least in part on the first LLR. Additionally, or alternatively, the receiver wireless communication device 510 may decode the second set of bits based at least in part on the second LLR. Additional details regarding these features are described in connection with FIG. 8.

As described above, MLC may be effective for wired communications due to the relatively stable channel conditions for the wired communications. In contrast, MLC may not be effective for wireless communications since the channel conditions may change with greater frequency. For example, on a wireless channel, there may be fading and interference, which may attenuate the signal strength and may reduce the SINR. Therefore, some modulation symbols may see worse SINR than other modulation symbols, and the packet error may be determined by the worst-case SINR across all of the modulation symbols. Using the techniques and apparatuses described herein, a wireless communication device may apply coded spreading and interleaving for different MLC modulation levels. This may enable the wireless communication device to communicate a wireless signal using MLC, thereby resulting in improved energy savings and reduced coding complexity.

As indicated above, FIG. 7 is provided as an example. Other examples may differ from what is described with regard to FIG. 7.

Figure 8:
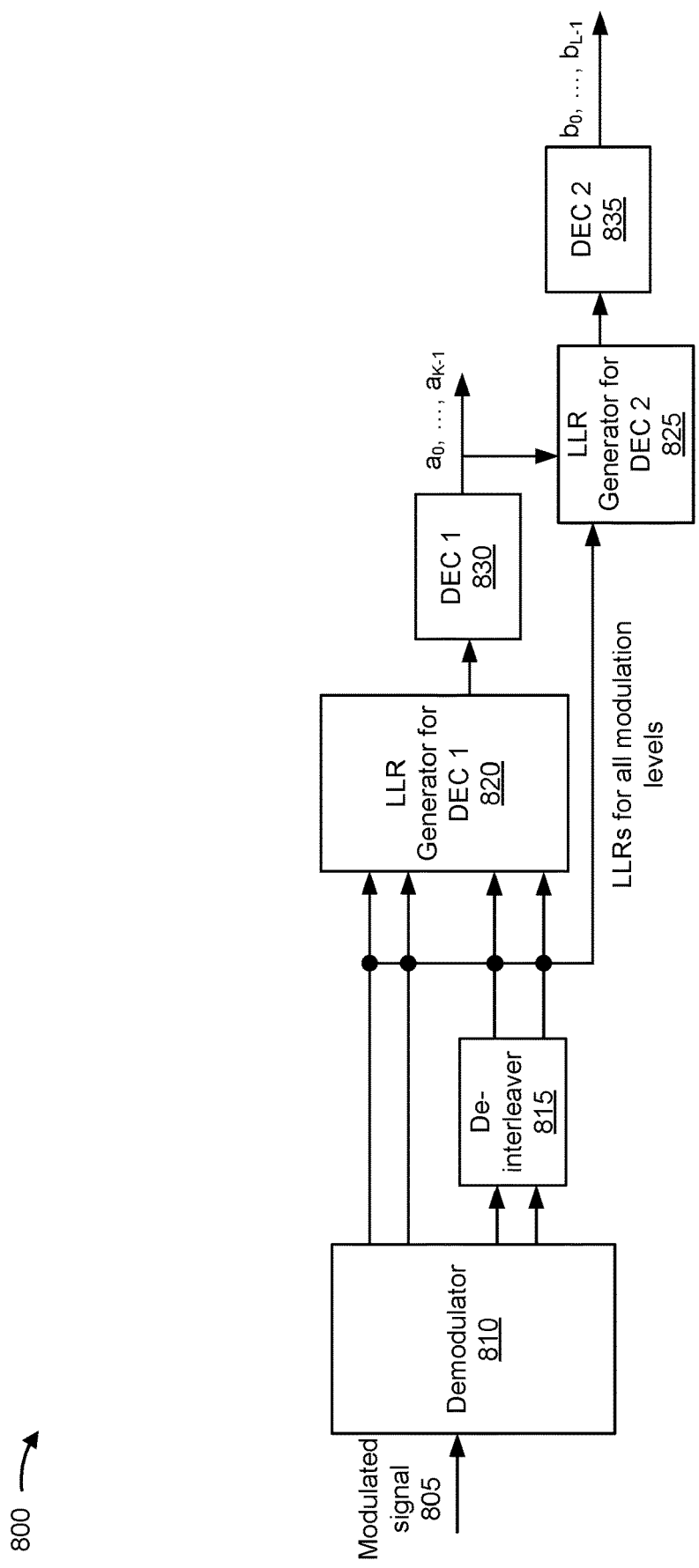
FIG. 8 is a diagram illustrating an example of a receiver wireless communication device for MLC communication, in accordance with the present disclosure.

FIG. 8 is a diagram illustrating an example 800 of a receiver wireless communication device for MLC communication, in accordance with the present disclosure. The receiver wireless communication device may be the receiver wireless communication device 510 described herein. In some aspects, the transmitter wireless communication device may include a demodulator 810, a de-interleaver 815, an LLR generator for a first decoder 820, an LLR generator for a second decoder 825, the first decoder (DEC 1) 830, and the second decoder (DEC 2) 835.

In some aspects, the demodulator 810 may receive a modulated signal 805. The modulated signal 805 may be based at least in part on the modulated signal 630 described in connection with FIG. 6. In some aspects, the modulated signal 805 may include a first set of bits, such as a first encoded set of bits, associated with a first set of modulation layers, and a second set of bits, such as an interleaved second set of bits, associated with a second set of modulation layers.

In some aspects, the de-interleaver 815 may de-interleave the interleaved second set of bits. As described herein, the second set of bits may be interleaved by the transmitter wireless communication device 505 such that a same bit corresponding to the first set of modulation layers and the second set of modulation layers does not modulate to the same modulation symbol on the first set of modulation layers and the second set of modulation layers. An output of the de-interleaver 815 may include a non-interleaved second set of bits.

In some aspects, the LLR generator for the first decoder 820 may generate a first LLR associated with decoding the first set of bits. For example, the LLR generator for the first decoder 820 may generate a first LLR based at least in part on interference caused by the second set of bits (e.g., the non-interleaved second set of bits) to the encoded first set of bits. In some aspects, the LLR generator for the second decoder 825 may generate a second LLR associated with decoding the second set of bits. For example, the LLR generator for the second decoder 825 may generate a second LLR based at least in part on a combination of the observations for the second set of bits (e.g., the non-interleaved second set of bits) from both the first set of modulation layers and the second set of modulation layers.

In some aspects, the first decoder 830 may decode the first set of modulation layers to obtain a non-encoded first set of bits. The first decoder 830 may decode the first set of modulation layers based at least in part on the first LLR. An output of the first decoder 830 may be the non-encoded first set of bits, such as the first set of bits $a_0$ through $a_{K-1}$ ($a_0, \ldots, a_{K-1}$) associated with a first set of modulation layers described herein. In some aspects, the second decoder 835 may decode the second set of modulation layers to obtain a non-encoded second set of bits. The second decoder 835 may decode the second set of modulation layers based at least in part on the second LLR. An output of the second decoder 835 may be the non-encoded second set of bits, such as the second set of bits $b_0$ through $b_{N-1}$ ($b_0, \ldots, b_{N-1}$) associated with a second set of modulation layers described herein.

As indicated above, FIG. 8 is provided as an example. Other examples may differ from what is described with regard to FIG. 8.

Figure 9:
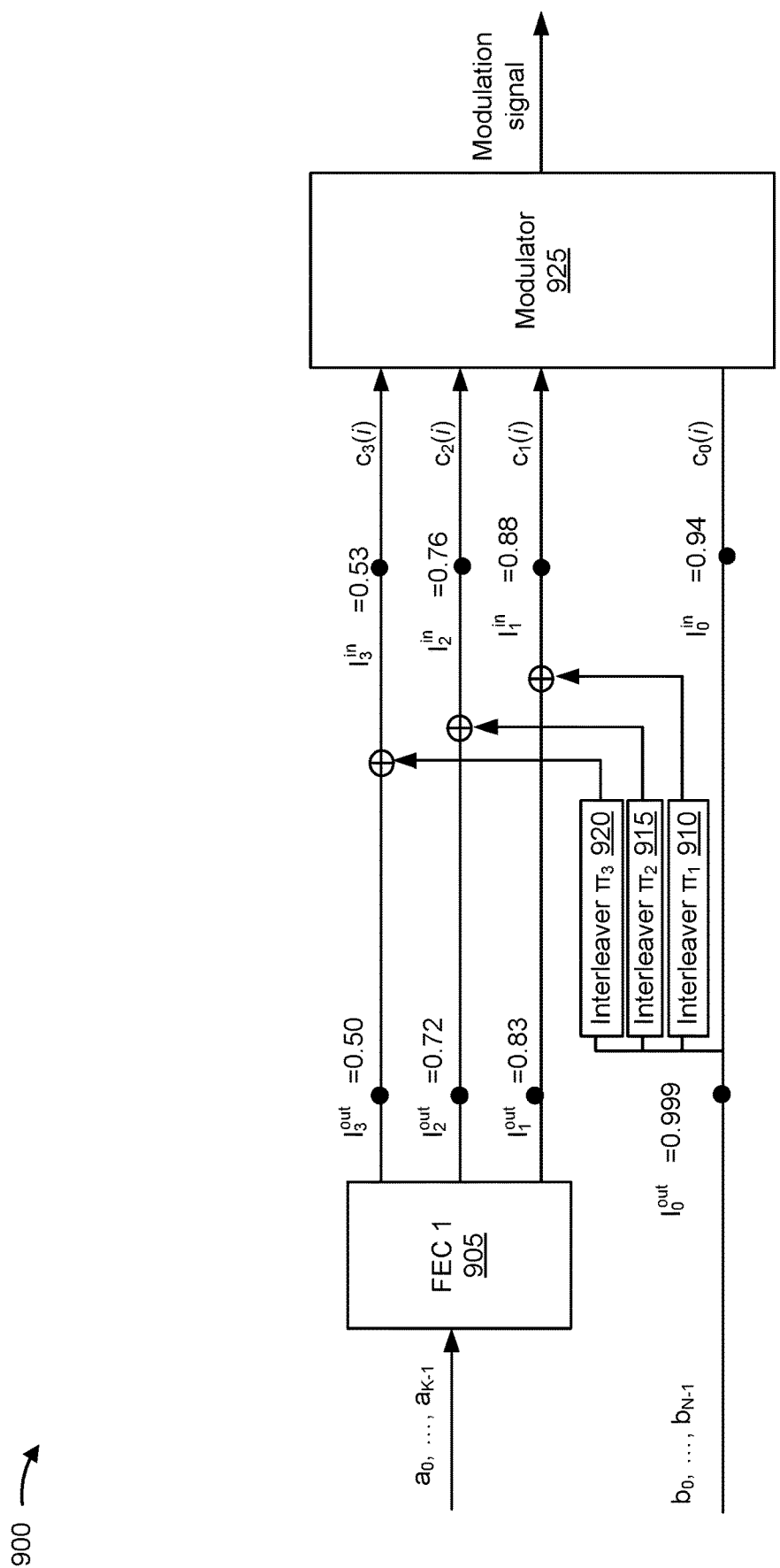
FIG. 9 is a diagram illustrating an example of a transmitter wireless communication device for MLC communication, in accordance with the present disclosure.

FIG. 9 is a diagram illustrating an example 900 of a transmitter wireless communication device for MLC communication, in accordance with the present disclosure. The transmitter wireless communication device may include an FEC encoder (FEC 1) 905, a first interleaver 910 (interleaver $\pi_1$), a second interleaver 915 (interleaver $\pi_2$), a third interleaver 920 (interleaver $\pi_3$), and a modulator 925.

In some aspects, the FEC encoder 905 may encode a first set of bits $a_0$ through $a_{K-1}$ ($a_0, \ldots, a_{K-1}$) associated with a first set of modulation layers. The first FEC encoder 905 may output a first portion of bits associated with a first subset of the first set of modulation layers (shown as $c_1(i)$), a second portion of bits associated with a second subset of the first set of modulation layers (shown as $c_2(i)$), and a third portion of bits associated with a third subset of the first subset of modulation layers (shown as $c_3(i)$).

In some aspects a second set of bits $b_0$ through $b_{N-1}$ ($b_0, \ldots, b_{N-1}$) associated with a second set of modulation layers ($c_0(i)$) may be combined with the first portion of the bits, the second portion of the bits, and the third portion of the bits. For example, the first interleaver 910 may interleave the second set of bits, and may combine the interleaved second set of bits with the first portion of the bits associated with the first subset of the first set of modulation layers using a first XOR operation. The second interleaver 915 may interleave the second set of bits, and may combine the interleaved second set of bits with the second portion of the bits associated with the second subset of the first set of modulation layers using a second XOR operation. The third interleaver 920 may interleave the second set of bits, and may combine the interleaved second set of bits with the third portion of the bits associated with the third subset of the first set of modulation layers using a third XOR operation. In some aspects, the second set of bits may be uncoded.

As shown in FIG. 9, mutual information associated with the first portion of the bits ($I_1^{out}$) may be 0.83, and mutual information associated with the first portion of the bits combined with the second set of bits ($I_1^{in}$) may be 0.88. Mutual information associated with the second portion of the bits ($I_2^{out}$) may be 0.72, and mutual information associated with the second portion of the bits combined with the second set of bits ($I_2^{in}$) may be 0.76. Mutual information associated with the third portion of the bits ($I_3^{out}$) may be 0.50, and mutual information associated with the third portion of the bits combined with the second set of bits ($I_3^{in}$) may be 0.53. Mutual information associated with the non-interleaved second set of bits ($I_0^{out}$) may be 0.999, and mutual information associated with the interleaved second set of bits ($I_0^{in}$) may be 0.94. In some aspects, the capacity of the bits on the second set of modulation layers may be increased due to spreading, thereby reducing the complexity of decoding the bits in the second set of modulation layers. Additionally, the use of interleavers ensures that every bit $b_i$ in the second set of bits ($b_0, \ldots, b_{N-1}$) is mapped to up to four different modulation symbols, thereby having a diversity order of four. Therefore, as long as one of the four modulation symbols does not experience deep fading, information about the uncoded bits $b_i$ may be obtained.

As indicated above, FIG. 9 is provided as an example. Other examples may differ from what is described with regard to FIG. 9. For example, a different number of layers, spreading factors, or interleavers may be used.

Figure 10:
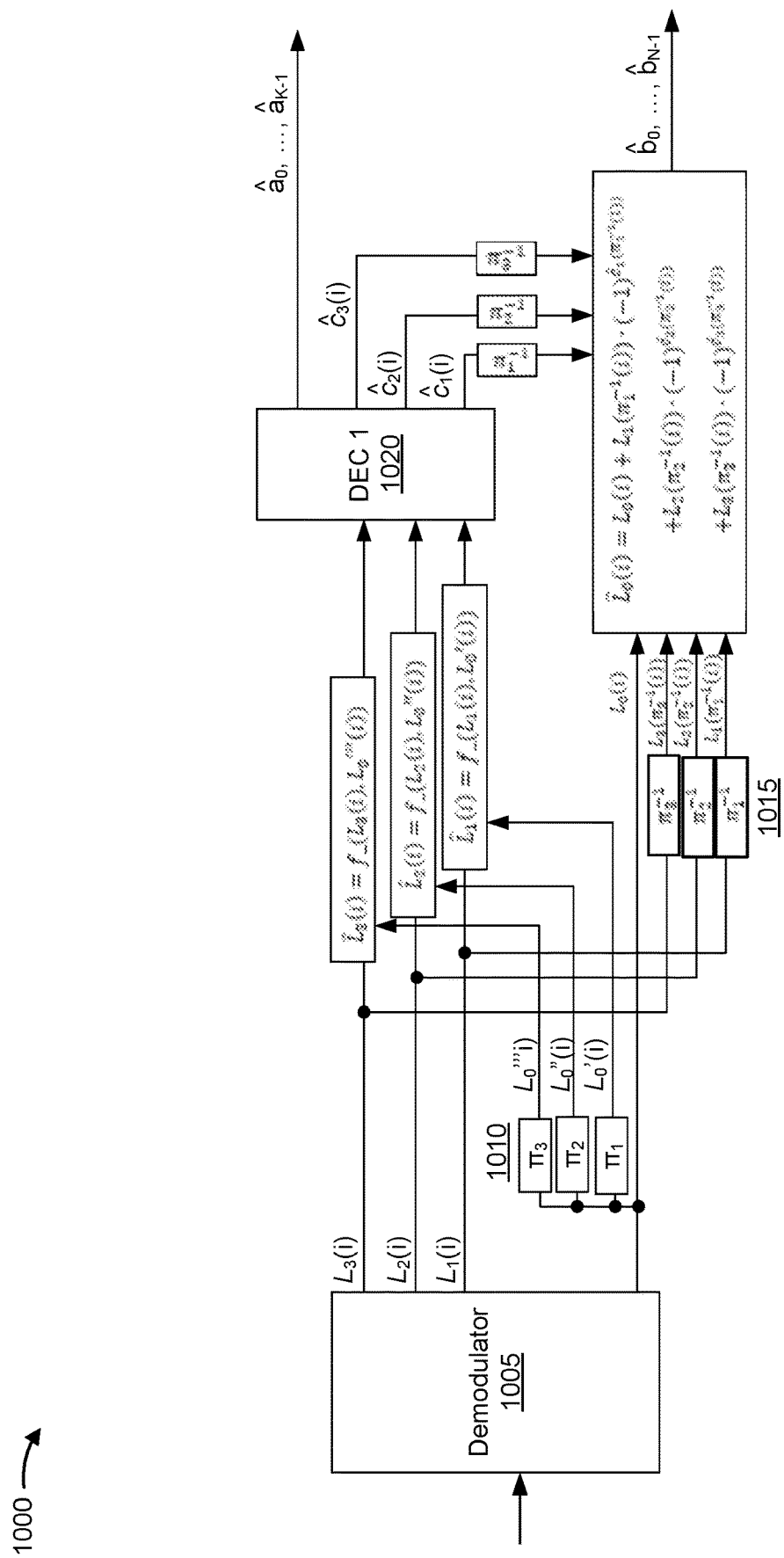
FIG. 10 is a diagram illustrating an example of a receiver wireless communication device for MLC communication, in accordance with the present disclosure.

FIG. 10 is a diagram illustrating an example 1000 of a receiver wireless communication device for MLC communication, in accordance with the present disclosure. The receiver wireless communication device may include a demodulator 1005, a plurality of interleavers 1010, a plurality of de-interleavers 1015, and a decoder (DEC 1) 1020. As described herein, the demodulator 1005 may receive a modulation signal that indicates a plurality of modulation layers. For example, the demodulator 1005 may receive a modulation signal that is output by the modulator 925. In some aspects, the demodulator 1005 may obtain a first encoded set of bits associated with a first subset of a first set of modulation layers ($L_1(i)$), a second encoded set of bits associated with a second subset of the first set of modulation layers ($L_2(i)$), a third encoded set of bits associated with a third subset of the first set of modulation layers ($L_3(i)$), and a non-encoded set of bits.

In some aspects, the plurality of interleavers 1010 may interleave the non-encoded set bits. For example, a first interleaver (interleaver $\pi_1$), a second interleaver (interleaver $\pi_2$), and a third interleaver (interleaver $\pi_3$) may interleave the set of non-encoded bits. In some aspects, the plurality of de-interleavers may de-interleave the first encoded set of bits, the second encoded set of bits, and the third encoded set of bits. For example, a first de-interleaver (interleaver $\pi_1^{-1}$) may de-interleave the first encoded set of bits to generate a non-interleaved first set of bits, a second de-interleaver (interleaver $\pi_2^{-1}$) may de-interleave the second encoded set of bits to generate a non-interleaved second set of bits, and a third de-interleaver (interleaver $\pi_3^{-1}$) may de-interleave the third encoded set of bits to generate a non-interleaved third set of bits.

In some aspects, the decoder 1020 may output a first set of bits based at least in part on decoding the non-interleaved first set of bits, the non-interleaved second set of bits, and the non-interleaved third set of bits. The first set of bits may be the first set of bits $\hat{a}_0$ through $\hat{a}_{K-1}$ ($\hat{a}_0, \ldots, \hat{a}_{K-1}$). Additionally, or alternatively, the decoder 1020 may generate a plurality of outputs $\hat{c}_1(i)$, $\hat{c}_2(i)$, and $\hat{c}_3(i)$ corresponding to a plurality of XOR operations between the second set of bits and a first portion of the first set of bits, a second portion of the first set of bits, and a third portion of the first set of bits, respectively. The receiver wireless communication device may generate a second set of bits ($\hat{b}_0, \ldots, \hat{b}_{N-1}$) based at least in part on an operation between respective outputs from the de-interleavers 1015 and the decoder 1020.

In some aspects, before decoding an output from the first encoder, the interference caused by the second set of bits on the encoded first set of bits may need to be removed. This may be done by the f_ function shown in FIG. 10. In some aspects, after decoding the coded bits in the first set of bits, the LLR values on the first set of modulation layers (Layer 1, 2, 3) and on the second set of modulation layers (Layer 0) may be used to generate a final estimate/decoding for the second set of bits $b_0, \ldots, b_{N-1}$, as shown in FIG. 10.

As indicated above, FIG. 10 is provided as an example. Other examples may differ from what is described with regard to FIG. 10.

Figure 11:
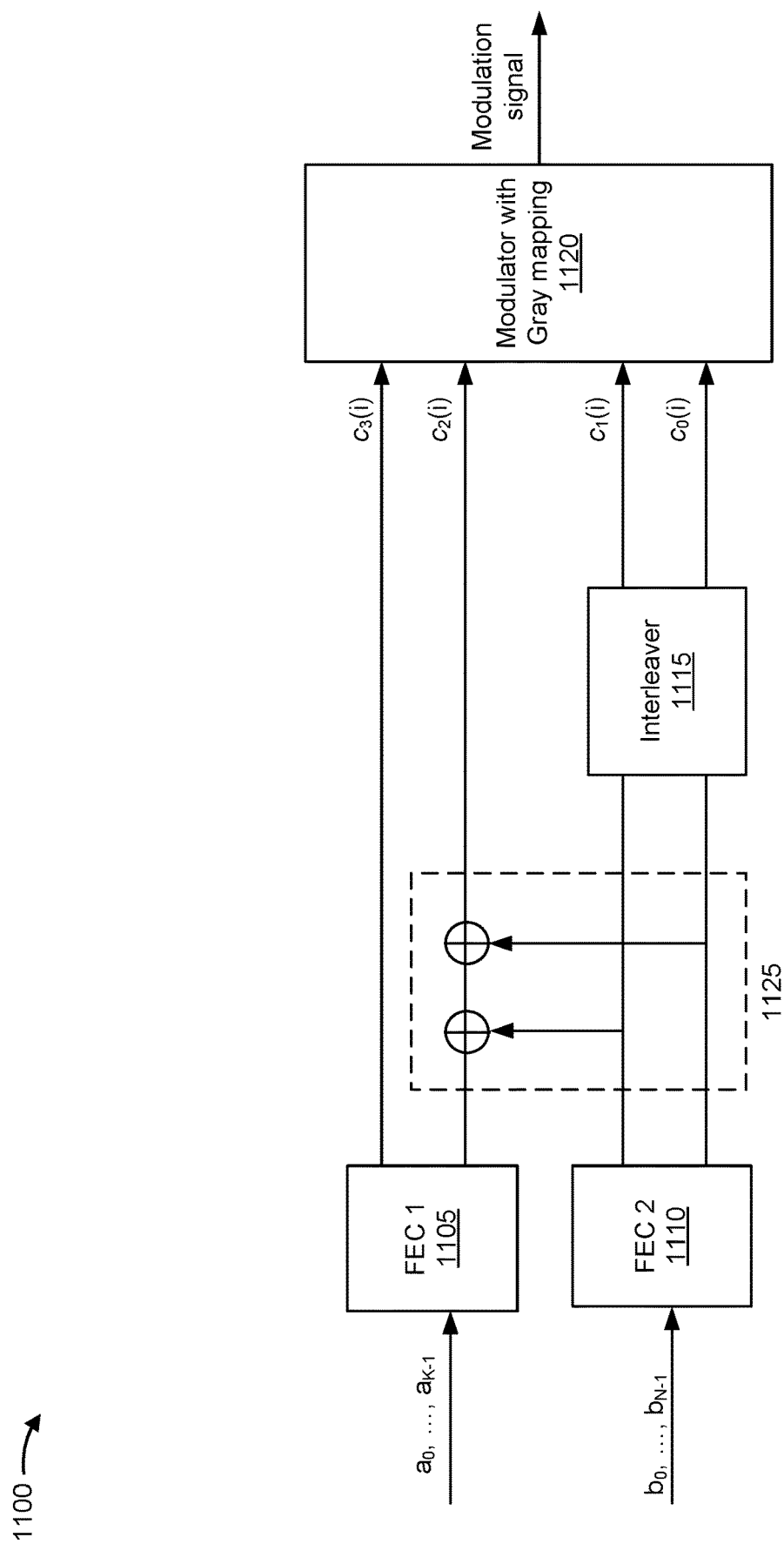
FIG. 11 is a diagram illustrating an example of a transmitter wireless communication device for MLC communication, in accordance with the present disclosure.

FIG. 11 is a diagram illustrating an example 1100 of a transmitter wireless communication device for MLC communication, in accordance with the present disclosure. In some aspects, a first set of bits $a_0$ through $a_{K-1}$ ($a_0, \ldots, a_{K-1}$) associated with a first set of modulation layers may be encoded by a first encoder (FEC 1) 1105, and a second set of bits $b_0$ through $b_{N-1}$ ($b_0, \ldots, b_{N-1}$) associated with a second set of modulation layers may be encoded by a second encoder (FEC 2) 1110, as described herein. A first portion of the second set of bits associated with a first subset of the second set of modulation layers may be combined (e.g., XORed) with a portion of the first set of bits, and a second portion of the second set of bits associated with a second subset of the second set of modulation layers may be combined with the portion (e.g., the same portion) of the first set of bits. The portion of the first set of bits may be associated with a subset of the first set of modulation layers. In some aspects, the interleaver 1115 may interleave the second set of bits. For example, the interleaver 1115 may interleave the first portion of the second set of bits to generate $c_0(i)$ and may interleave the second portion of the second set of bits to generate $c_1(i)$. An input to the modulator 1120 (e.g., the modulator with gray mapping) may include $c_0(i)$, $c_1(i)$, $c_2(i)$, and $c_3(i)$, where $c_2(i)$ is an output of the XOR operations described above and $c_3(i)$ is another portion of the first set of bits (e.g., another portion of the first set of bits corresponding to another subset of the first set of modulation layers). As described herein, the modulator 1120 may output a modulation signal.

In some aspects, without the interleaver 1115, the coded spreading (shown by the dashed line 1125) may change the bit to constellation mapping from a Gray mapping to "double-Gray" mapping (also known as "multi-level gray mapping"). Using Gray mapping, the bits may be mapped to a constellation such that the bit labeling of adjacent constellations only differ by one bit. Using set partitioning mapping, conditioned on a subset of bits A, the mapping of a remaining subset of bits B are the same, regardless of the values of the subset of bits in A. Double-gray mapping may be a hybrid of Gray mapping and et partitioning mapping. For example, for bits in the same coding level ($[c_0, c_1]$ (corresponding to the first set of modulation layers) and $[c_2, c_3]$) (corresponding to the second set of modulation layers), Gray mapping is used, but for bits across different coding levels, set partitioning mapping is used. However, the addition of the interleaver 1115 adds additional benefits (e.g., provides a higher level of robustness against channel selectivity and/or interference). For example, on an AWGN channel, the interleaver has no performance gain, but on a fading channel, since the bits on FEC 2 are spread over two different modulation symbols, the output may be more robust against fading.

As indicated above, FIG. 11 is provided as an example. Other examples may differ from what is described with regard to FIG. 11.

Figure 12:
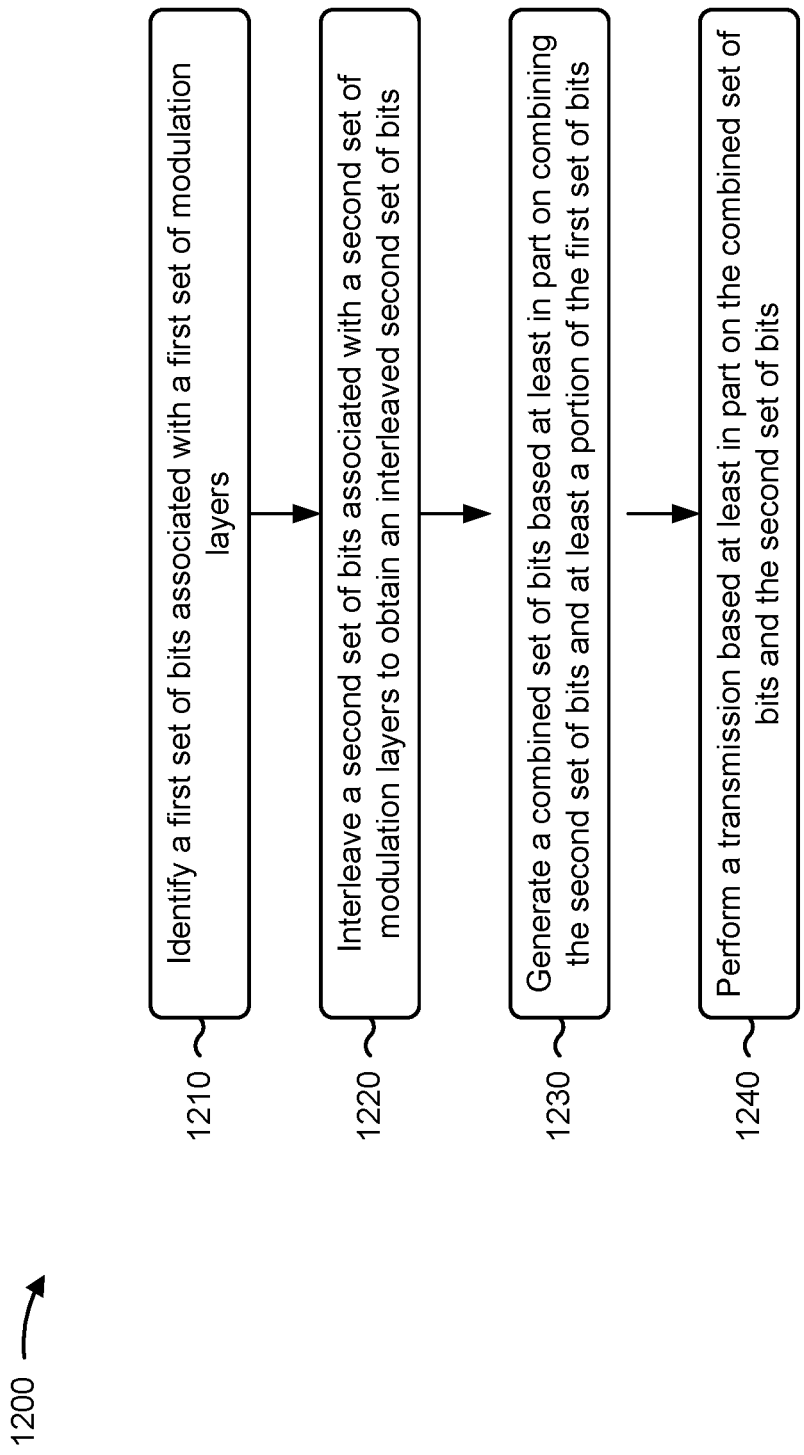
FIG. 12 is a diagram illustrating an example process performed, for example, by a wireless communication device, in accordance with the present disclosure.

FIG. 12 is a diagram illustrating an example process 1200 performed, for example, by a wireless communication device, in accordance with the present disclosure. Example process 1200 is an example where the wireless communication device (e.g., transmitter wireless communication device 505) performs operations associated with coded spreading and interleaving for MLC systems.

As shown in FIG. 12, in some aspects, process 1200 may include identifying a first set of bits associated with a first set of modulation layers (block 1210). For example, the wireless communication device (e.g., using communication manager 140 and/or encoding component 1408, depicted in FIG. 14) may identify a first set of bits associated with a first set of modulation layers, as described above.

As further shown in FIG. 12, in some aspects, process 1200 may include interleaving a second set of bits associated with a second set of modulation layers to obtain an interleaved second set of bits (block 1220). For example, the wireless communication device (e.g., using communication manager 140 and/or interleaving component 1410, depicted in FIG. 14) may interleave a second set of bits associated with a second set of modulation layers to obtain an interleaved second set of bits, as described above.

As further shown in FIG. 12, in some aspects, process 1200 may include generating a combined set of bits based at least in part on combining the interleaved second set of bits and at least a portion of the encoded first set of bits (block 1230). For example, the wireless communication device (e.g., using communication manager 140 and/or generating component 1412, depicted in FIG. 14) may generate a combined set of bits based at least in part on combining the interleaved second set of bits and at least a portion of the encoded first set of bits, as described above.

As further shown in FIG. 12, in some aspects, process 1200 may include performing a transmission based at least in part on the combined set of bits and the interleaved second set of bits (block 1240). For example, the wireless communication device (e.g., using communication manager 140 and/or transmission component 1404, depicted in FIG. 14) may perform a transmission based at least in part on the combined set of bits and the interleaved second set of bits, as described above.

Process 1200 may include additional aspects, such as any single aspect or any combination of aspects described below and/or in connection with one or more other processes described elsewhere herein.

In a first aspect, process 1200 includes encoding the second set of bits associated with the second set of modulation layers to obtain an encoded second set of bits, wherein interleaving the second set of bits to obtain the interleaved second set of bits comprises interleaving the encoded second set of bits to obtain the interleaved second set of bits.

In a second aspect, alone or in combination with the first aspect, encoding the first set of bits to obtain the encoded first set of bits comprises encoding the first set of bits using a first type of encoding, and encoding the second set of bits to obtain the encoded second set of bits comprises encoding the second set of bits using a second type of encoding that is different than the first type of encoding.

In a third aspect, alone or in combination with one or more of the first and second aspects, the first type of encoding uses a higher coding rate than the second type of encoding.

In a fourth aspect, alone or in combination with one or more of the first through third aspects, process 1200 includes generating a modulation symbol based at least in part on the combined set of bits and the interleaved second set of bits, wherein performing the transmission based at least in part on the combined set of bits and the interleaved second set of bits comprises transmitting the modulation symbol.

In a fifth aspect, alone or in combination with one or more of the first through fourth aspects, combining the interleaved second set of bits and the portion of the encoded first set of bits comprises performing an XOR operation between the interleaved second set of bits and the portion of the encoded first set of bits.

In a sixth aspect, alone or in combination with one or more of the first through fifth aspects, performing the XOR operation between the interleaved second set of bits and the portion of the encoded first set of bits comprises performing a first XOR operation between the interleaved second set of bits and a first portion of the first encoded set of bits that is associated with a first subset of the first set of modulation layers and performing a second XOR operation between the interleaved second set of bits and a second portion of the encoded first set of bits that is associated with a second subset of the first set of modulation layers.

In a seventh aspect, alone or in combination with one or more of the first through sixth aspects, process 1200 includes encoding the interleaved second set of bits prior to performing the XOR operation between the interleaved second set of bits and the portion of the encoded first set of bits.

In an eighth aspect, alone or in combination with one or more of the first through seventh aspects, interleaving the second set of bits comprises interleaving the second set of bits such that a same bit corresponding to the first set of modulation layers and the second set of modulation layers does not modulate to a corresponding modulation symbol in the first set of modulation layers and the second set of modulation layers.

In a ninth aspect, alone or in combination with one or more of the first through eighth aspects, process 1200 includes interleaving the encoded first set of bits.

In a tenth aspect, alone or in combination with one or more of the first through ninth aspects, process 1200 includes combining a third set of bits with at least one of the encoded first set of bits, the interleaved second set of bits, and the combined set of bits to obtain a second combined set of bits, and performing another transmission based at least in part on the second combined set of bits.

In an eleventh aspect, alone or in combination with one or more of the first through tenth aspects, combining the interleaved second set of bits and at least the portion of the encoded first set of bits comprises performing a first spreading operation between the interleaved second set of bits and a first portion of the encoded first set of bits that is associated with a first subset of the first set of modulation layers, performing a second spreading operation between the interleaved second set of bits and a second portion of the encoded first set of bits that is associated with a second subset of the first set of modulation layers, and performing a third spreading operation between the interleaved second set of bits and a third portion of the encoded first set of bits that is associated with a third subset of the first set of modulation layers.

In a twelfth aspect, alone or in combination with one or more of the first through eleventh aspects, process 1200 includes generating a modulation symbol based at least in part on an output of the first spreading operation, an output of the second spreading operation, an output of the third spreading operation, and the interleaved second set of bits.

In a thirteenth aspect, alone or in combination with one or more of the first through twelfth aspects, combining the interleaved second set of bits and at least the portion of the encoded first set of bits comprises performing a first spreading operation between a portion of the encoded first set of bits that is associated with a subset of the first set of modulation layers and a portion of the interleaved second set of bits that is associated with a subset of the second set of modulation layers, and performing a second spreading operation between the portion of the encoded set of bits that is associated with the subset of the first set of modulation layers and another portion of the interleaved second set of bits that is associated with another subset of the second set of modulation layers.

In a fourteenth aspect, alone or in combination with one or more of the first through thirteenth aspects, process 1200 includes generating a modulation symbol based at least in part on another portion of the encoded first set of bits associated with another subset of the first set of modulation layers, an output of the first spreading operation and the second spreading operation, the portion of the interleaved second set of bits, and the other portion of the interleaved second set of bits.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
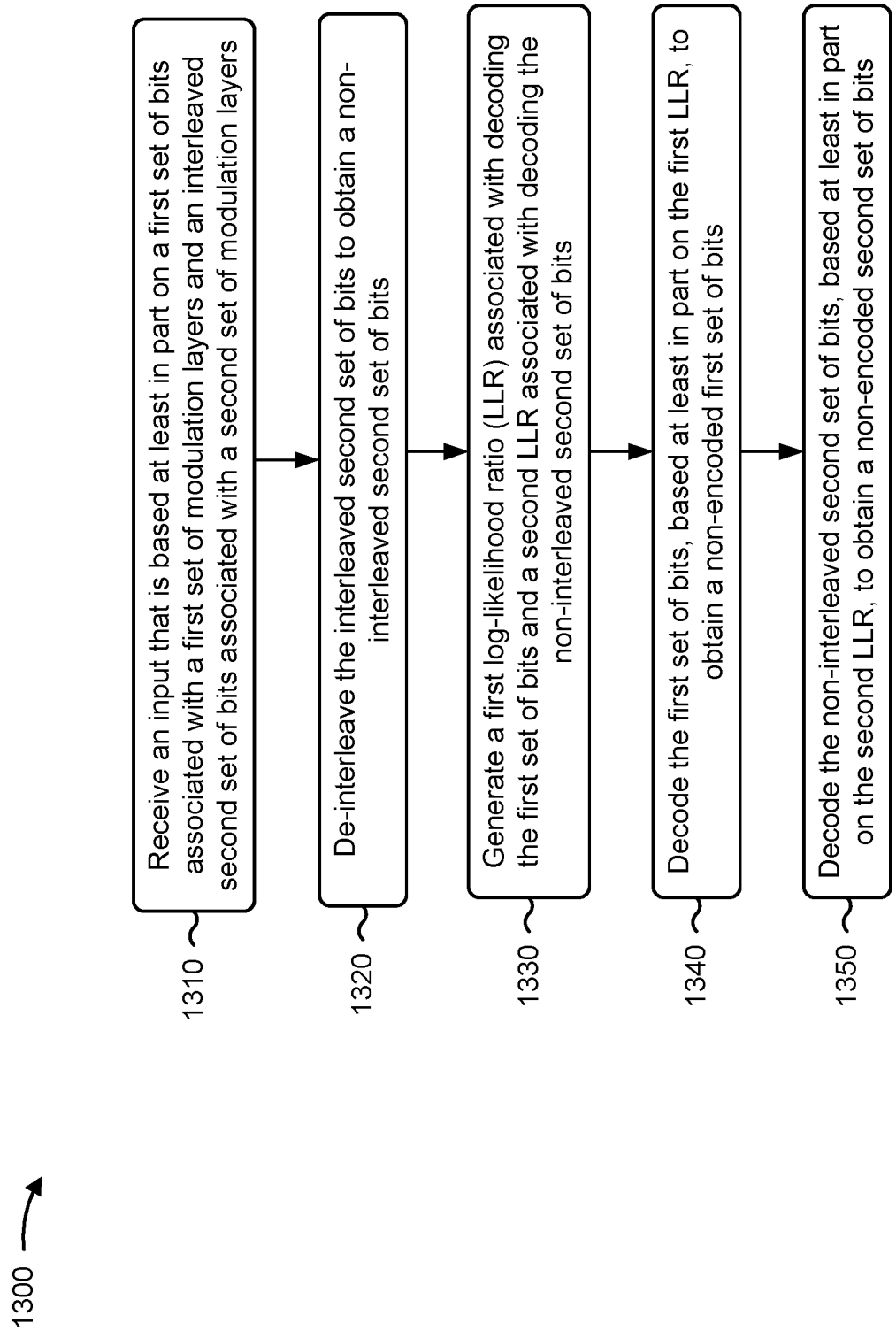
FIG. 13 is a diagram illustrating an example process performed, for example, by a wireless communication device, in accordance with the present disclosure.

FIG. 13 is a diagram illustrating an example process 1300 performed, for example, by a wireless communication device, in accordance with the present disclosure. Example process 1300 is an example where the wireless communication device (e.g., receiver wireless communication device 510) performs operations associated with coded spreading and interleaving for MLC systems.

As shown in FIG. 13, in some aspects, process 1300 may include receiving an input that is based at least in part on a first set of bits associated with a first set of modulation layers and an interleaved second set of bits associated with a second set of modulation layers (block 1310). For example, the wireless communication device (e.g., using communication manager 150 and/or reception component 1502, depicted in FIG. 15) may receive an input that is based at least in part on a first set of bits associated with a first set of modulation layers and an interleaved second set of bits associated with a second set of modulation layers, as described above.

As further shown in FIG. 13, in some aspects, process 1300 may include de-interleaving the interleaved second set of bits to obtain a non-interleaved second set of bits (block 1320). For example, the wireless communication device (e.g., using communication manager 150 and/or de-interleaving component 1508, depicted in FIG. 15) may de-interleave the interleaved second set of bits to obtain a non-interleaved second set of bits, as described above.

As further shown in FIG. 13, in some aspects, process 1300 may include generating a first LLR associated with decoding the first set of bits and a second LLR associated with decoding the non-interleaved second set of bits (block 1330). For example, the wireless communication device (e.g., using communication manager 150 and/or generating component 1510, depicted in FIG. 15) may generate a first LLR associated with decoding the first set of bits and a second LLR associated with decoding the non-interleaved second set of bits, as described above.

As further shown in FIG. 13, in some aspects, process 1300 may include decoding the first set of bits, based at least in part on the first LLR, to obtain a non-encoded first set of bits (block 1340). For example, the wireless communication device (e.g., using communication manager 150 and/or decoding component 1512, depicted in FIG. 15) may decode the first set of bits, based at least in part on the first LLR, to obtain a non-encoded first set of bits, as described above.

As further shown in FIG. 13, in some aspects, process 1300 may include decoding the non-interleaved second set of bits, based at least in part on the second LLR, to obtain a non-encoded second set of bits (block 1350). For example, the wireless communication device (e.g., using communication manager 150 and/or decoding component 1512, depicted in FIG. 15) may decode the non-interleaved second set of bits, based at least in part on the second LLR, to obtain a non-encoded second set of bits, as described above.

Process 1300 may include additional aspects, such as any single aspect or any combination of aspects described below and/or in connection with one or more other processes described elsewhere herein.

In a first aspect, receiving the input comprises receiving a modulation signal that is based at least in part on the first set of bits and the interleaved second set of bits, wherein the wireless communication device is further configured to demodulate the modulation signal to obtain the first set of bits and the interleaved second set of bits.

In a second aspect, alone or in combination with the first aspect, generating the first LLR for decoding the first set of bits comprises generating an LLR for removing interference that is caused by the interleaved second set of bits to a portion of the first set of bits that corresponds to a subset of the first set of modulation layers.

In a third aspect, alone or in combination with one or more of the first and second aspects, generating the second LLR for decoding the second set of bits comprises generating an LLR for removing interference that is caused by the interleaved second set of bits to the portion of the first set of bits that corresponds to the subset of the first set of modulation layers and to another portion of the first set of bits that corresponds to another subset of the first set of modulation layers.

In a fourth aspect, alone or in combination with one or more of the first through third aspects, the first set of bits is encoded using a first type of encoding and the interleaved second set of bits is encoded using a second type of encoding that is different than the first type of encoding.

In a fifth aspect, alone or in combination with one or more of the first through fourth aspects, the first type of encoding uses a higher coding rate than the second type of encoding.

In a sixth aspect, alone or in combination with one or more of the first through fifth aspects, the first set of modulation layers comprises a first subset that includes a portion of the first set of bits that is combined with the interleaved second set of bits and a second subset that includes another portion of the first set of bits that is combined with the interleaved second set of bits.

In a seventh aspect, alone or in combination with one or more of the first through sixth aspects, the portion of the first set of bits is combined with the interleaved second set of bits using a first XOR operation and the other portion of the first set of bits is combined with the interleaved second set of bits using a second XOR operation.

In an eighth aspect, alone or in combination with one or more of the first through seventh aspects, receiving the input that is based at least in part on the first set of bits and the interleaved second set of bits comprises receiving an input that is based at least in part on the first set of bits associated with the first set of modulation layers, the interleaved second set of bits associated with the second set of modulation layers, and a third set of bits associated with a third set of modulation layers, wherein the wireless communication device is further configured to generate a third LLR for decoding the third set of bits and to decode the third set of bits based at least in part on the third LLR.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
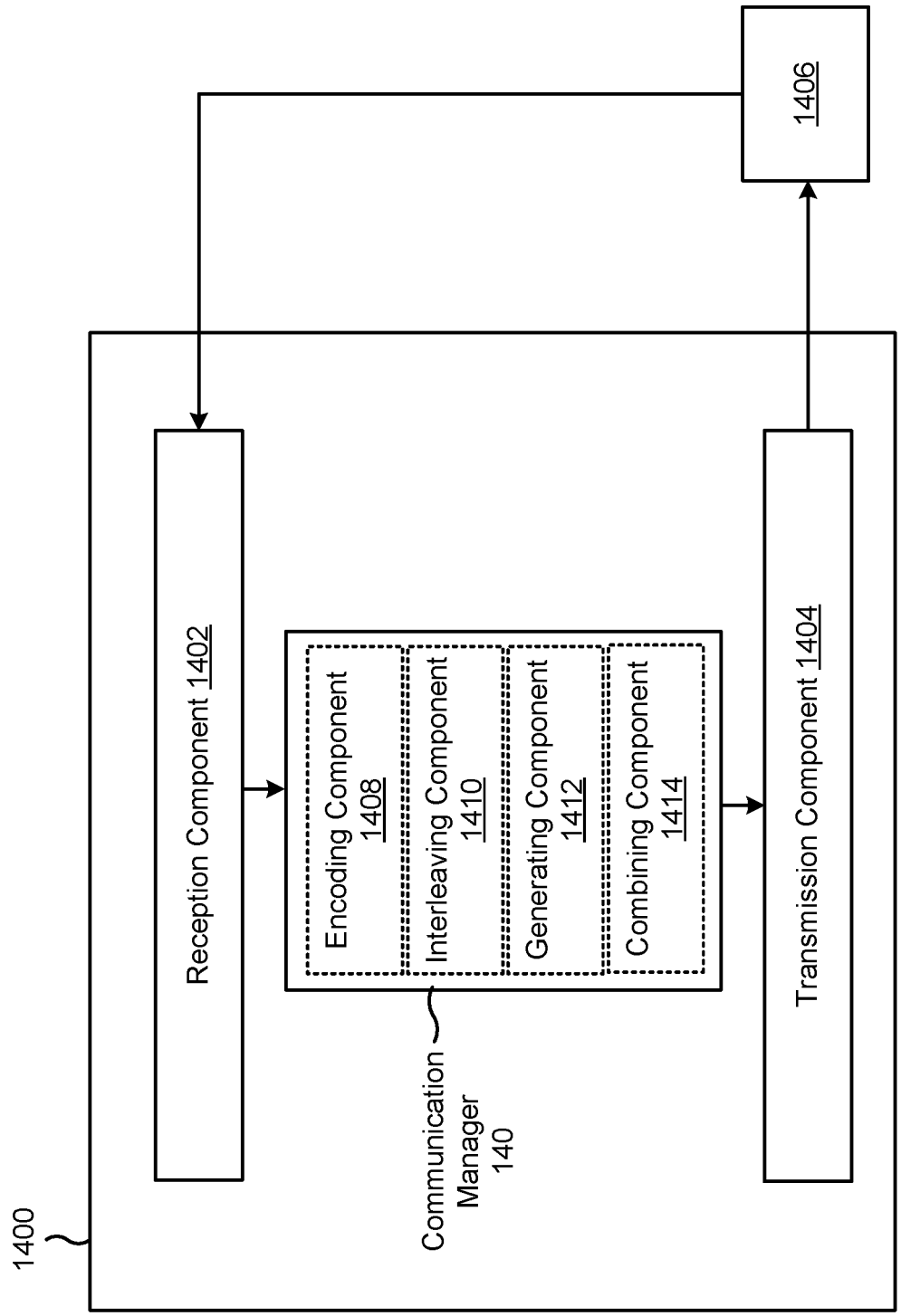
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a wireless communication device, or a wireless communication device may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140) may include one or more of an encoding component 1408, an interleaving component 1410, a generating component 1412, or a combining component 1414, among other examples.

In some aspects, the apparatus 1400 may be configured to perform one or more operations described herein in connection with FIGS. 5-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the wireless communication device described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the wireless communication device described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the wireless communication device described in connection with FIG. 2. In some aspects, the transmission component 1404 may be co-located with the reception component 1402 in a transceiver.

The encoding component 1408 may identify a first set of bits associated with a first set of modulation layers. The interleaving component 1410 may interleave a second set of bits associated with a second set of modulation layers to obtain an interleaved second set of bits. The generating component 1412 may generate a combined set of bits based at least in part on combining the interleaved second set of bits and at least a portion of the first set of bits. The transmission component 1404 may perform a transmission based at least in part on the combined set of bits and the interleaved second set of bits.

The encoding component 1408 may encode the second set of bits associated with the second set of modulation layers to obtain an encoded second set of bits, wherein interleaving the second set of bits to obtain the interleaved second set of bits comprises interleaving the encoded second set of bits to obtain the interleaved second set of bits. The generating component 1412 may generate a modulation symbol based at least in part on the combined set of bits and the interleaved second set of bits, wherein performing the transmission based at least in part on the combined set of bits and the interleaved second set of bits comprises transmitting the modulation symbol. The encoding component 1408 may encode the interleaved second set of bits prior to performing the XOR operation between the interleaved second set of bits and the portion of the encoded first set of bits. The interleaving component 1410 may interleave the encoded first set of bits. The combining component 1414 may combine a third set of bits with at least one of the encoded first set of bits, the interleaved second set of bits, and the combined set of bits to obtain a second combined set of bits, and performing another transmission based at least in part on the second combined set of bits.

The generating component 1412 may generate a modulation symbol based at least in part on an output of the first spreading operation, an output of the second spreading operation, an output of the third spreading operation, and the interleaved second set of bits. The generating component 1412 may generate a modulation symbol based at least in part on another portion of the encoded first set of bits associated with another subset of the first set of modulation layers, an output of the first spreading operation and the second spreading operation, the portion of the interleaved second set of bits, and the other portion of the interleaved second set of bits.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
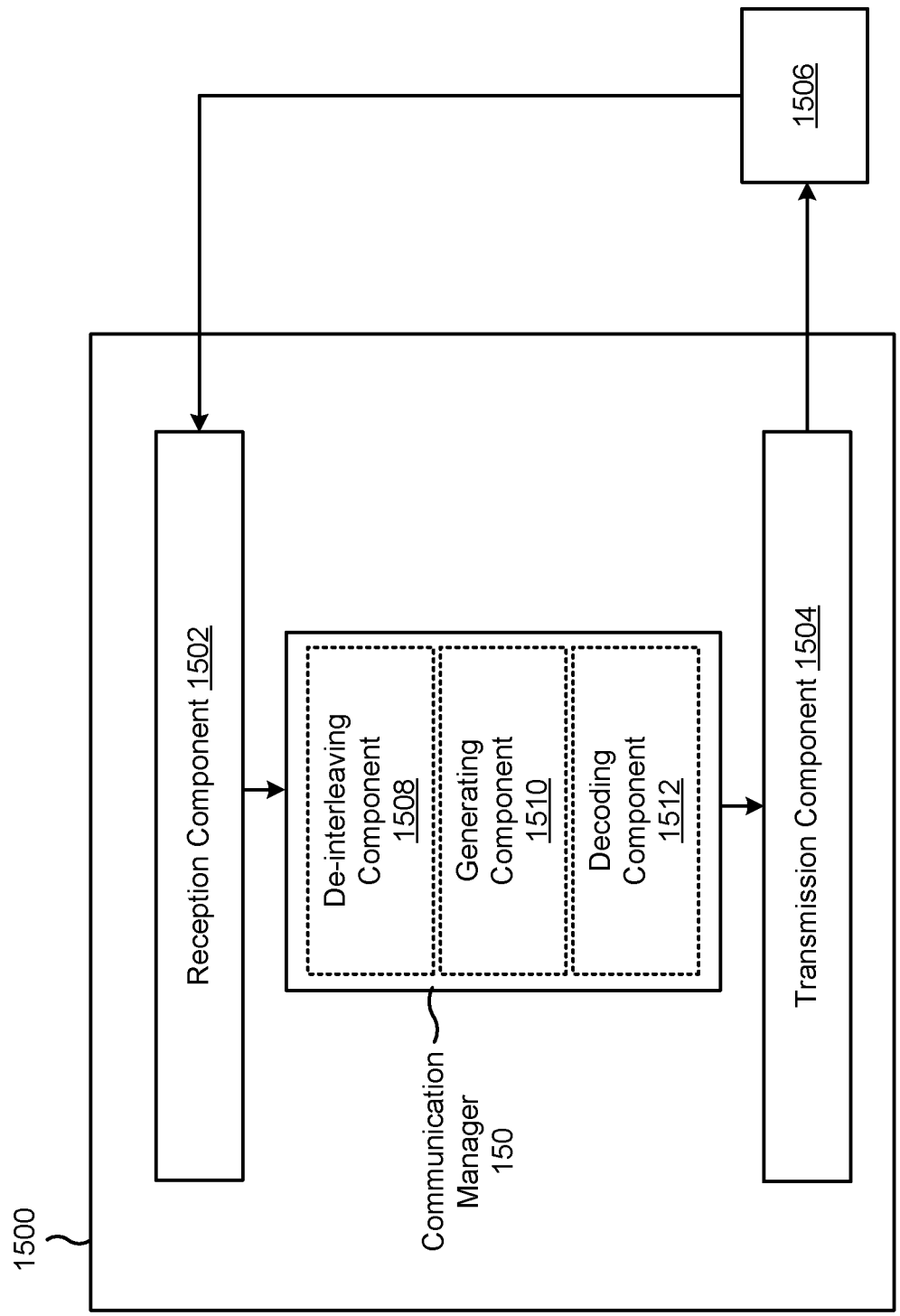
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a wireless communication device, or a wireless communication device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include one or more of a de-interleaving component 1508, a generating component 1510, or a decoding component 1512, among other examples.

In some aspects, the apparatus 1500 may be configured to perform one or more operations described herein in connection with FIGS. 5-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the wireless communication device described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the wireless communication device described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the wireless communication device described in connection with FIG. 2. In some aspects, the transmission component 1504 may be co-located with the reception component 1502 in a transceiver.

The reception component 1502 may receive an input that is based at least in part on a first set of bits associated with a first set of modulation layers and an interleaved second set of bits associated with a second set of modulation layers. The de-interleaving component 1508 may de-interleave the interleaved second set of bits to obtain a non-interleaved second set of bits. The generating component 1510 may generate a first LLR associated with decoding the first set of bits and a second LLR associated with decoding the non-interleaved second set of bits. The decoding component 1512 may decode the first set of bits, based at least in part on the first LLR, to obtain a non-encoded first set of bits. The decoding component 1512 may decode the non-interleaved second set of bits, based at least in part on the second LLR, to obtain a non-encoded second set of bits.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a wireless communication device, comprising: identifying a first set of bits associated with a first set of modulation layers; interleaving a second set of bits associated with a second set of modulation layers to obtain an interleaved second set of bits; generating a combined set of bits based at least in part on combining the interleaved second set of bits and at least a portion of the first set of bits; and performing a transmission based at least in part on the combined set of bits and the interleaved second set of bits.

Aspect 2: The method of Aspect 1, further comprising encoding the first set of bits associated with the first set of modulation layers to obtain an encoded first set of bits and encoding the second set of bits associated with the second set of modulation layers to obtain an encoded second set of bits, wherein interleaving the second set of bits to obtain the interleaved second set of bits comprises interleaving the encoded second set of bits to obtain the interleaved second set of bits.

Aspect 3: The method of Aspect 2, wherein encoding the first set of bits to obtain the encoded first set of bits comprises encoding the first set of bits using a first type of encoding, and wherein encoding the second set of bits to obtain the encoded second set of bits comprises encoding the second set of bits using a second type of encoding that is different than the first type of encoding.

Aspect 4: The method of Aspect 3, wherein the first type of encoding uses a higher coding rate than the second type of encoding.

Aspect 5: The method of any of Aspects 1-4, further comprising generating a modulation symbol based at least in part on the combined set of bits and the interleaved second set of bits, wherein performing the transmission based at least in part on the combined set of bits and the interleaved second set of bits comprises transmitting the modulation symbol.

Aspect 6: The method of any of Aspects 1-5, wherein combining the interleaved second set of bits and the portion of the first set of bits comprises performing an exclusive OR (XOR) operation between the interleaved second set of bits and the portion of the first set of bits.

Aspect 7: The method of Aspect 6, wherein performing the XOR operation between the interleaved second set of bits and the portion of the first set of bits comprises performing a first XOR operation between the interleaved second set of bits and a first portion of the first encoded set of bits that is associated with a first subset of the first set of modulation layers and performing a second XOR operation between the interleaved second set of bits and a second portion of the first set of bits that is associated with a second subset of the first set of modulation layers.

Aspect 8: The method of Aspect 6, further comprising encoding the interleaved second set of bits prior to performing the XOR operation between the interleaved second set of bits and the portion of the first set of bits.

Aspect 9: The method of any of Aspects 1-8, wherein interleaving the second set of bits comprises interleaving the second set of bits such that a same bit corresponding to the first set of modulation layers and the second set of modulation layers does not modulate to a corresponding modulation symbol in the first set of modulation layers and the second set of modulation layers.

Aspect 10: The method of any of Aspects 1-9, further comprising interleaving the first set of bits.

Aspect 11: The method of any of Aspects 1-10, further comprising combining a third set of bits with at least one of the first set of bits, the interleaved second set of bits, and the combined set of bits to obtain a second combined set of bits, and performing another transmission based at least in part on the second combined set of bits.

Aspect 12: The method of any of Aspects 1-11, wherein combining the interleaved second set of bits and at least the portion of the first set of bits comprises performing a first spreading operation between the interleaved second set of bits and a first portion of the first set of bits that is associated with a first subset of the first set of modulation layers, performing a second spreading operation between the interleaved second set of bits and a second portion of the first set of bits that is associated with a second subset of the first set of modulation layers, and performing a third spreading operation between the interleaved second set of bits and a third portion of the first set of bits that is associated with a third subset of the first set of modulation layers.

Aspect 13: The method of Aspect 12, further comprising generating a modulation symbol based at least in part on an output of the first spreading operation, an output of the second spreading operation, an output of the third spreading operation, and the interleaved second set of bits.

Aspect 14: The method of any of Aspects 1-13, wherein combining the interleaved second set of bits and at least the portion of the first set of bits comprises performing a first spreading operation between a portion of the first set of bits that is associated with a subset of the first set of modulation layers and a portion of the interleaved second set of bits that is associated with a subset of the second set of modulation layers, and performing a second spreading operation between the portion of the encoded set of bits that is associated with the subset of the first set of modulation layers and another portion of the interleaved second set of bits that is associated with another subset of the second set of modulation layers.

Aspect 15: The method of Aspect 14, further comprising generating a modulation symbol based at least in part on another portion of the first set of bits associated with another subset of the first set of modulation layers, an output of the first spreading operation and the second spreading operation, the portion of the interleaved second set of bits, and the other portion of the interleaved second set of bits.

Aspect 16: A method of wireless communication performed by a wireless communication device, comprising: receiving an input that is based at least in part on a first set of bits associated with a first set of modulation layers and an interleaved second set of bits associated with a second set of modulation layers; de-interleaving the interleaved second set of bits to obtain a non-interleaved second set of bits; generating a first log-likelihood ratio (LLR) associated with decoding the first set of bits and a second LLR associated with decoding the non-interleaved second set of bits; decoding the first set of bits, based at least in part on the first LLR, to obtain a non-encoded first set of bits; and decoding the non-interleaved second set of bits, based at least in part on the second LLR, to obtain a non-encoded second set of bits.

Aspect 17: The method of Aspect 16, wherein receiving the input comprises receiving a modulation signal that is based at least in part on the first set of bits and the interleaved second set of bits, wherein the wireless communication device is further configured to demodulate the modulation signal to obtain the first set of bits and the interleaved second set of bits.

Aspect 18: The method of any of Aspects 16-17, wherein generating the first LLR for decoding the first set of bits comprises generating an LLR for removing interference that is caused by the interleaved second set of bits to a portion of the first set of bits that corresponds to a subset of the first set of modulation layers.

Aspect 19: The method of Aspect 18, wherein generating the second LLR for decoding the second set of bits comprises generating an LLR for removing interference that is caused by the interleaved second set of bits to the portion of the first set of bits that corresponds to the subset of the first set of modulation layers and to another portion of the first set of bits that corresponds to another subset of the first set of modulation layers.

Aspect 20: The method of any of Aspects 16-19, wherein the first set of bits is encoded using a first type of encoding and the interleaved second set of bits is encoded using a second type of encoding that is different than the first type of encoding.

Aspect 21: The method of Aspect 20, wherein the first type of encoding uses a higher coding rate than the second type of encoding.

Aspect 22: The method of any of Aspects 16-21, wherein the first set of modulation layers comprises a first subset that includes a portion of the first set of bits that is combined with the interleaved second set of bits and a second subset that includes another portion of the first set of bits that is combined with the interleaved second set of bits.

Aspect 23: The method of Aspect 22, wherein the portion of the first set of bits is combined with the interleaved second set of bits using a first exclusive OR (XOR) operation and the other portion of the first set of bits is combined with the interleaved second set of bits using a second XOR operation.

Aspect 24: The method of any of Aspects 16-23, wherein receiving the input that is based at least in part on the first set of bits and the interleaved second set of bits comprises receiving an input that is based at least in part on the first set of bits associated with the first set of modulation layers, the interleaved second set of bits associated with the second set of modulation layers, and a third set of bits associated with a third set of modulation layers, wherein the wireless communication device is further configured to generate a third LLR for decoding the third set of bits and to decode the third set of bits based at least in part on the third LLR.

Aspect 25: An apparatus for wireless communication at a device, comprising a processor; memory coupled with the processor; and instructions stored in the memory and executable by the processor to cause the apparatus to perform the method of one or more of Aspects 1-15.

Aspect 26: A device for wireless communication, comprising a memory and one or more processors coupled to the memory, the one or more processors configured to perform the method of one or more of Aspects 1-15.

Aspect 27: An apparatus for wireless communication, comprising at least one means for performing the method of one or more of Aspects 1-15.

Aspect 28: A non-transitory computer-readable medium storing code for wireless communication, the code comprising instructions executable by a processor to perform the method of one or more of Aspects 1-15.

Aspect 29: A non-transitory computer-readable medium storing a set of instructions for wireless communication, the set of instructions comprising one or more instructions that, when executed by one or more processors of a device, cause the device to perform the method of one or more of Aspects 1-15.

Aspect 30: An apparatus for wireless communication at a device, comprising a processor; memory coupled with the processor; and instructions stored in the memory and executable by the processor to cause the apparatus to perform the method of one or more of Aspects 16-24.

Aspect 31: A device for wireless communication, comprising a memory and one or more processors coupled to the memory, the one or more processors configured to perform the method of one or more of Aspects 16-24.

Aspect 32: An apparatus for wireless communication, comprising at least one means for performing the method of one or more of Aspects 16-24.

Aspect 33: A non-transitory computer-readable medium storing code for wireless communication, the code comprising instructions executable by a processor to perform the method of one or more of Aspects 16-24.

Aspect 34: A non-transitory computer-readable medium storing a set of instructions for wireless communication, the set of instructions comprising one or more instructions that, when executed by one or more processors of a device, cause the device to perform the method of one or more of Aspects 16-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless communication device, comprising:
    a memory; and
    one or more processors, coupled to the memory, configured to:
        identify a first set of bits associated with a first set of modulation layers;
        interleave a second set of bits associated with a second set of modulation layers to obtain an interleaved second set of bits;
        generate a combined set of bits based at least in part on combining the second set of bits and at least a portion of the first set of bits; and
        perform a transmission based at least in part on the combined set of bits and the second set of bits.

2. The apparatus of claim 1, wherein interleaving the second set of bits comprises interleaving the second set of bits prior to generating the combined set of bits, wherein the combined set of bits includes interleaved second set of bits and at least the portion of the first set of bits.

3. The apparatus of claim 1, wherein interleaving the second set of bits comprises interleaving the second set of bits after generating the combined set of bits, wherein the combined set of bits includes a non-interleaved second set of bits and at least the portion of the first set of bits.

4. The apparatus of claim 1, wherein the one or more processors are further configured to encode the first set of bits associated with the first set of modulation layers to obtain an encoded first set of bits and encode the second set of bits associated with the second set of modulation layers to obtain an encoded second set of bits, wherein interleaving the second set of bits to obtain the interleaved second set of bits comprises interleaving the encoded second set of bits to obtain the interleaved second set of bits.

5. The apparatus of claim 4, wherein encoding the first set of bits to obtain the encoded first set of bits comprises encoding the first set of bits using a first type of encoding, and wherein encoding the second set of bits to obtain the encoded second set of bits comprises encoding the second set of bits using a second type of encoding that is different than the first type of encoding.

6. The apparatus of claim 5, wherein the first type of encoding uses a higher coding rate than the second type of encoding.

7. The apparatus of claim 1, wherein the one or more processors are further configured to generate a modulation symbol based at least in part on the combined set of bits and the second set of bits, wherein performing the transmission based at least in part on the combined set of bits and the second set of bits comprises transmitting the modulation symbol.

8. The apparatus of claim 1, wherein the one or more processors, to combine the second set of bits and the portion of the first set of bits, are configured to perform an exclusive OR (XOR) operation between the interleaved second set of bits and the portion of the first set of bits.

9. The apparatus of claim 8, wherein the one or more processors, to perform the XOR operation between the interleaved second set of bits and the portion of the first set of bits, are configured to perform a first XOR operation between the interleaved second set of bits and a first portion of the first encoded set of bits that is associated with a first subset of the first set of modulation layers and performing a second XOR operation between the interleaved second set of bits and a second portion of the first set of bits that is associated with a second subset of the first set of modulation layers.

10. The apparatus of claim 8, wherein the one or more processors are further configured to encode the interleaved second set of bits prior to performing the XOR operation between the interleaved second set of bits and the portion of the first set of bits.

11. The apparatus of claim 1, wherein the one or more processors, to interleave the second set of bits, are configured to interleave the second set of bits such that a same bit corresponding to the first set of modulation layers and the second set of modulation layers does not modulate to a corresponding modulation symbol in the first set of modulation layers and the second set of modulation layers.

12. The apparatus of claim 1, wherein the one or more processors are further configured to interleave the first set of bits.

13. The apparatus of claim 1, wherein the one or more processors are further configured to combine a third set of bits with at least one of the first set of bits, the interleaved second set of bits, and the combined set of bits to obtain a second combined set of bits, and performing another transmission based at least in part on the second combined set of bits.

14. The apparatus of claim 1, wherein the one or more processors, to combine the second set of bits and at least the portion of the first set of bits, are configured to perform a first spreading operation between the interleaved second set of bits and a first portion of the first set of bits that is associated with a first subset of the first set of modulation layers, perform a second spreading operation between the interleaved second set of bits and a second portion of the first set of bits that is associated with a second subset of the first set of modulation layers, and perform a third spreading operation between the interleaved second set of bits and a third portion of the first set of bits that is associated with a third subset of the first set of modulation layers.

15. The apparatus of claim 14, wherein the one or more processors are further configured to generate a modulation symbol based at least in part on an output of the first spreading operation, an output of the second spreading operation, an output of the third spreading operation, and the interleaved second set of bits.

16. The apparatus of claim 1, wherein the one or more processors, to combine the second set of bits and at least the portion of the first set of bits, are configured to perform a first spreading operation between a portion of the first set of bits that is associated with a subset of the first set of modulation layers and a portion of the interleaved second set of bits that is associated with a subset of the second set of modulation layers, and perform a second spreading operation between the portion of the set of bits that is associated with the subset of the first set of modulation layers and another portion of the interleaved second set of bits that is associated with another subset of the second set of modulation layers.

17. The apparatus of claim 16, wherein the one or more processors are further configured to generate a modulation symbol based at least in part on another portion of the first set of bits associated with another subset of the first set of modulation layers, an output of the first spreading operation and the second spreading operation, the portion of the interleaved second set of bits, and the other portion of the interleaved second set of bits.

18. An apparatus for wireless communication at a wireless communication device, comprising:
  a memory; and
  one or more processors, coupled to the memory, configured to:
    receive an input that is based at least in part on a first set of bits associated with a first set of modulation layers and an interleaved second set of bits associated with a second set of modulation layers;
    de-interleave the interleaved second set of bits to obtain a non-interleaved second set of bits;
    generate a first log-likelihood ratio (LLR) associated with decoding the first set of bits and a second LLR associated with decoding the non-interleaved second set of bits;
    decode the first set of bits, based at least in part on the first LLR, to obtain a non-encoded first set of bits; and
    decode the non-interleaved second set of bits, based at least in part on the second LLR, to obtain a non-encoded second set of bits.

19. The apparatus of claim 18, wherein receiving the input comprises receiving a modulation signal that is based at least in part on the first set of bits and the interleaved second set of bits, wherein the wireless communication device is further configured to demodulate the modulation signal to obtain the first set of bits and the interleaved second set of bits.

20. The apparatus of claim 18, wherein the one or more processors, to generate the first LLR for decoding the first set of bits, are configured to generate an LLR for removing interference that is caused by the interleaved second set of bits to a portion of the first set of bits that corresponds to a subset of the first set of modulation layers.

21. The apparatus of claim 20, wherein the one or more processors, to generate the second LLR for decoding the second set of bits, are configured to generate an LLR for removing interference that is caused by the interleaved second set of bits to the portion of the first set of bits that corresponds to the subset of the first set of modulation layers and to another portion of the first set of bits that corresponds to another subset of the first set of modulation layers.

22. The apparatus of claim 18, wherein the first set of bits is encoded using a first type of encoding and the interleaved second set of bits is encoded using a second type of encoding that is different than the first type of encoding.

23. The apparatus of claim 22, wherein the first type of encoding uses a higher coding rate than the second type of encoding.

24. The apparatus of claim 18, wherein the first set of modulation layers comprises a first subset that includes a portion of the first set of bits that is combined with the interleaved second set of bits and a second subset that includes another portion of the first set of bits that is combined with the interleaved second set of bits.

25. The apparatus of claim 24, wherein the portion of the first set of bits is combined with the interleaved second set of bits using a first exclusive OR (XOR) operation and the other portion of the first set of bits is combined with the interleaved second set of bits using a second XOR operation.

26. The apparatus of claim 18, wherein receiving the input that is based at least in part on the first set of bits and the interleaved second set of bits comprises receiving an input that is based at least in part on the first set of bits associated with the first set of modulation layers, the interleaved second set of bits associated with the second set of modulation layers, and a third set of bits associated with a third set of modulation layers, wherein the wireless communication device is further configured to generate a third LLR for decoding the third set of bits and to decode the third set of bits based at least in part on the third LLR.

27. A method of wireless communication performed by a wireless communication device, comprising:
  identifying a first set of bits associated with a first set of modulation layers;
  interleaving a second set of bits associated with a second set of modulation layers to obtain an interleaved second set of bits;
  generating a combined set of bits based at least in part on combining the second set of bits and at least a portion of the first set of bits; and
  performing a transmission based at least in part on the combined set of bits and the second set of bits.

28. The method of claim 27, further comprising encoding the first set of bits associated with the first set of modulation layers to obtain an encoded first set of bits and encoding the second set of bits associated with the second set of modulation layers to obtain an encoded second set of bits, wherein interleaving the second set of bits to obtain the interleaved second set of bits comprises interleaving the encoded second set of bits to obtain the interleaved second set of bits.

29. A method of wireless communication performed by a wireless communication device, comprising:
- receiving an input that is based at least in part on a first set of bits associated with a first set of modulation layers and an interleaved second set of bits associated with a second set of modulation layers;
- de-interleaving the interleaved second set of bits to obtain a non-interleaved second set of bits;
- generating a first log-likelihood ratio (LLR) associated with decoding the first set of bits and a second LLR associated with decoding the non-interleaved second set of bits;
- decoding the first set of bits, based at least in part on the first LLR, to obtain a non-encoded first set of bits; and
- decoding the non-interleaved second set of bits, based at least in part on the second LLR, to obtain a non-encoded second set of bits.

30. The method of claim 29, wherein the first set of modulation layers comprises a first subset that includes a portion of the first set of bits that is combined with the interleaved second set of bits and a second subset that includes another portion of the first set of bits that is combined with the interleaved second set of bits.

* * * * *